(12) United States Patent
Molchanov et al.

(10) Patent No.: US 10,481,696 B2
(45) Date of Patent: Nov. 19, 2019

(54) RADAR BASED USER INTERFACE

(71) Applicant: NVIDIA Corporation, Santa Clara, CA (US)

(72) Inventors: Pavlo Molchanov, Santa Clara, CA (US); Shalini Gupta, San Francisco, CA (US); Kihwan Kim, Sunnyvale, CA (US); Kari Pulli, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 312 days.

(21) Appl. No.: 15/060,545

(22) Filed: Mar. 3, 2016

(65) Prior Publication Data

US 2016/0259037 A1 Sep. 8, 2016

Related U.S. Application Data

(60) Provisional application No. 62/127,754, filed on Mar. 3, 2015, provisional application No. 62/127,759, filed on Mar. 3, 2015.

(51) Int. Cl.

| G06F 3/01 | (2006.01) |
|---|---|
| G01S 13/42 | (2006.01) |
| G01S 7/35 | (2006.01) |
| G01S 7/41 | (2006.01) |
| G01S 13/58 | (2006.01) |

(Continued)

(52) U.S. Cl.
CPC .............. *G06F 3/017* (2013.01); *B60R 11/04* (2013.01); *G01S 7/352* (2013.01); *G01S 7/415* (2013.01); *G01S 13/42* (2013.01); *G01S 13/584* (2013.01); *G06F 3/011* (2013.01); *G06K 9/00355* (2013.01); *G06K 9/6256* (2013.01); *G06K 9/6267* (2013.01); *G06K 9/6288* (2013.01); *G06K 9/78* (2013.01); *G06N 3/04* (2013.01);

(Continued)

(58) Field of Classification Search
CPC ........ G06F 3/017; G06F 3/012; G06F 3/0488; G06F 3/013; G06F 7/415; G06F 13/56; G06F 13/931; G06F 13/88; G06F 3/011; G06F 3/0304; G05D 1/0088; G05D 1/0246; G08G 1/166; H01Q 21/064; G06K 9/00355; G06K 9/6288; G06K 9/00335; G06K 9/00791; G06K 9/00845; G01S 13/42; G01S 13/584; G01S 7/352; G01S 7/415; G01S 17/58; G01S 13/88; G01S 13/931; G01S 17/936; G01S 13/865; G01S 13/867; G01S 2013/9375; G01S 17/023; G01S 17/89; G01S 13/89; B60W 2420/52

See application file for complete search history.

(56) References Cited

U.S. PATENT DOCUMENTS 6,753,780 B2  6/2004 Li
8,035,624 B2  10/2011 Bell et al.
(Continued)

Primary Examiner — Olumide Ajibade Akonai

(57) ABSTRACT

An apparatus and method for radar based gesture detection. The apparatus includes a processing element and a transmitter configured to transmit radar signals. The transmitter is coupled to the processing element. The apparatus further includes a plurality of receivers configured to receive radar signal reflections, where the plurality of receivers is coupled to the processing element. The transmitter and plurality of receivers are configured for short range radar and the processing element is configured to detect a hand gesture based on the radar signal reflections received by the plurality of receivers.

32 Claims, 18 Drawing Sheets

(51) Int. Cl.
*G06K 9/00* (2006.01)
*G06K 9/62* (2006.01)
*G06K 9/78* (2006.01)
*B60R 11/04* (2006.01)
*G06N 3/04* (2006.01)
*G06N 3/08* (2006.01)

(52) U.S. Cl.
CPC ............ *G06N 3/0454* (2013.01); *G06N 3/08* (2013.01); *G06N 3/082* (2013.01); *G06N 3/084* (2013.01)

(56) References Cited

U.S. PATENT DOCUMENTS

| | | |
|---|---|---|
| 8,072,470 B2 | 12/2011 | Marks |
| 8,437,506 B2 * | 5/2013 | Williams ................ G06F 3/011 348/46 |
| 8,717,291 B2 * | 5/2014 | Sun ........................ G06F 3/017 345/158 |
| 9,024,814 B2 | 5/2015 | Bangera et al. |
| 9,227,484 B1 | 1/2016 | Justice et al. |
| 9,403,501 B2 | 8/2016 | Teng et al. |
| 9,405,120 B2 | 8/2016 | Graf et al. |
| 9,671,492 B2 | 6/2017 | Diewald |
| 2005/0285966 A1 * | 12/2005 | Bamji ...................... G01C 3/08 348/336 |
| 2007/0096885 A1 * | 5/2007 | Cheng ................... B60W 40/04 340/435 |
| 2009/0109083 A1 * | 4/2009 | Tietjen .................... G01S 13/28 342/91 |
| 2009/0292468 A1 * | 11/2009 | Wu ........................ G01S 13/726 701/301 |
| 2010/0266210 A1 | 10/2010 | Markovic et al. |
| 2011/0131005 A1 | 6/2011 | Ueshima et al. |
| 2011/0181509 A1 * | 7/2011 | Rautiainen ............. G06F 3/017 345/158 |
| 2011/0181510 A1 * | 7/2011 | Hakala .................... G06F 3/017 345/158 |
| 2011/0296333 A1 * | 12/2011 | Bateman .............. G06F 3/04883 715/773 |
| 2012/0128201 A1 * | 5/2012 | Brickhill ............ G06K 9/00355 382/103 |
| 2012/0135805 A1 | 5/2012 | Miller, IV |
| 2012/0196660 A1 | 8/2012 | El Dokor et al. |
| 2012/0280900 A1 | 11/2012 | Wang et al. |
| 2013/0009865 A1 * | 1/2013 | Valik ....................... G06F 3/017 345/156 |
| 2013/0027218 A1 | 1/2013 | Schwarz et al. |
| 2013/0328763 A1 | 12/2013 | Latta et al. |
| 2013/0335318 A1 * | 12/2013 | Nagel ..................... G06F 3/017 345/156 |
| 2014/0324888 A1 * | 10/2014 | Xie ......................... G06F 3/017 707/748 |
| 2014/0354450 A1 * | 12/2014 | Takahashi ............... G01S 13/42 340/904 |
| 2014/0368434 A1 * | 12/2014 | Paek ....................... G06F 3/017 345/168 |
| 2015/0277569 A1 * | 10/2015 | Sprenger ................ G06F 3/017 345/156 |
| 2016/0055201 A1 * | 2/2016 | Poupyrev ............ G06F 17/3087 707/722 |
| 2016/0124512 A1 | 5/2016 | Maruya et al. |
| 2016/0188967 A1 * | 6/2016 | Chang ................ G06K 9/00362 348/148 |
| 2016/0223663 A1 * | 8/2016 | Schmalenberg ...... G01S 13/865 |
| 2016/0252607 A1 * | 9/2016 | Saboo .................... G01S 13/02 342/107 |
| 2016/0379108 A1 | 12/2016 | Chung et al. |
| 2016/0379109 A1 | 12/2016 | Chung et al. |
| 2017/0010653 A1 | 1/2017 | Chang et al. |

* cited by examiner

RADAR BASED USER INTERFACE

RELATED U.S. APPLICATIONS

This application claims the benefit of and priority to the provisional patent application, Ser. No. 62/127,754, entitled "IN-VEHICLE SHORT-RANGE RADAR SYSTEM FOR INTELLIGENT UIs," with filing date Mar. 3, 2015, and is hereby incorporated by reference in its entirety.

This application claims the benefit of and priority to the provisional patent application, Ser. No. 62/127,759, entitled "MULTI-SENSOR SYSTEM FOR DRIVER'S HAND GESTURE RECOGNITION," with filing date Mar. 3, 2015, and is hereby incorporated by reference in its entirety.

This application is related to non-provisional patent application, Ser. No. 15/060,525, entitled "MULTI-SENSOR SYSTEM AND METHOD FOR USER INTERFACE," with filing date Mar. 3, 2016, and is hereby incorporated by reference in its entirety.

FIELD

Embodiments of the present invention are generally related to user interfaces and gesture recognition.

BACKGROUND

As computer systems have advanced, computing systems have been used in a variety of new uses. The proliferation of computing systems into new areas of use, such as within vehicles, has resulted in previous user interface designs being not well suited or even insufficient. As a result, user interface designs can be clunky or difficult for users to interact and use particularly in the automobile environment. For example, a user may be distracted in trying to find the correct on-screen or physical button or knob in order to complete a task. This distraction can be dangerous to the user when in a moving vehicle.

SUMMARY OF THE INVENTION

Accordingly, what is needed is a solution to allow interaction and/or control of a computing system in an intuitive and natural way while minimizing distraction.

Embodiments allow for gesture recognition thereby allowing users to interact with computing devices in a natural manner. Improved accuracy and robustness to a variety of lighting conditions is provided. Power consumption is also reduced. In some embodiments, a radar based system configured for short range (e.g., use in a vehicle) is provided that is able to determine the 3D position and velocity of moving objects (e.g., parts of a user's hand) while consuming low power and operating in a variety of lighting conditions (e.g., sunlight and darkness). Embodiments are able to function with a high degree of accuracy without being affected by wind and sound with low interference from other devices.

In one embodiment, the present invention is directed to an apparatus for user gesture detection and classification. The apparatus includes a processing element and a transmitter configured to transmit radar signals. The transmitter is coupled to the processing element. The apparatus further includes a plurality of receivers configured to receive radar signal reflections (e.g., from a user's hand), where the plurality of receivers is coupled to the processing element. The transmitter and plurality of receivers are configured for short range radar based detection and the processing element is configured to detect a hand gesture based on the radar signal reflections received by the plurality of receivers. In some embodiments, the short range radar based detection has a range of one meter. In other embodiments, the transmitter and plurality of receivers are a portion of a user interface device of a vehicle. In some embodiments, a first pair of receivers of the plurality of receivers is configured to measure a vertical component of a gesture movement and a second pair of receivers of the plurality of receivers is configured to measure a horizontal component of the gesture movement. In one embodiment, the processing element is configured to determine a 3D position and a radial velocity for a signal reflection received by the plurality of receivers. In some embodiments, the processing element is further configured to determine an elevation angle and an azimuth angle for the signal reflection received by the plurality of receivers.

In some embodiments, the transmitter and the plurality of receivers are operated in a frequency-modulated continuous-wave (FMCW) mode. In some embodiments, the transmitter and the plurality of receivers are part of a multiple input single output (MISO) device. In other embodiments, the hand gesture is dynamic and the processing element is configured to automatically recognize the hand gesture and to determine a command associated with the dynamic hand gesture. In one embodiment, the plurality of receivers is spatially distributed.

In one embodiment, the present invention is directed toward a system for hand gesture detection and classification. The system includes a processing element and a transmitter configured for transmitting radar signals. The transmitter is coupled to the processing element. The system further includes a first receiver, a second receiver, and a third receiver, where the first receiver, the second receiver, and the third receiver are configured for receiving the radar signals. The first receiver and the second receiver are configured to measure a horizontal motion of a gesture and the second receiver and the third receiver are configured to measure a vertical motion of a gesture. The first receiver, the second receiver, and the third receiver are communicatively coupled to the processing element. The transmitter and the first receiver, the second receiver, and the third receiver are configured for short range radar based sensing and the processing element is configured to detect and classify a hand gesture based on reflections of the radar signals received by the first receiver, the second receiver, and the third receiver.

In some embodiments, the short range based detection of the hand gestures has a range of one meter. In other embodiments, the transmitter and the receivers are a portion of a user interface device of a vehicle. In one embodiment, the processing element is configured to determine a 3D position and a radial velocity for a signal reflection received from the receivers. The processing element may further be configured to determine an elevation angle and an azimuth angle of the reflected surface for the signal received from the receivers. The transmitter and the plurality of receivers may be operated in a frequency-modulated continuous-wave (FMCW) mode.

In another embodiment, the present invention is implemented as a mobile apparatus. The apparatus includes a processing element and a transmitter configured for transmitting radar signals, where the transmitter is coupled to the processing element. The apparatus further includes a first receiver, a second receiver, and a third receiver, where the first receiver, the second receiver, and the third receiver are configured for receiving the radar signals. The first receiver and the second receiver are configured to measure a horizontal motion of a gesture, and the second receiver and the third receiver are configured to measure a vertical motion of the gesture. The first receiver, the second receiver, and the third receiver are communicatively coupled to the processing element. The transmitter and the first receiver, the second receiver, and the third receiver are configured for short range radar based sensing and the processing element is configured to detect and classify a hand gesture of a driver of the mobile apparatus of the reflected surface for the signal received by the first receiver, the second receiver, and the third receiver. The processing element is configured to automatically determine a command associated with the hand gesture.

In some embodiments, the short range based sensing has a range of substantially one meter. In other embodiments, the processing element is further configured to perform background subtraction. In one embodiment, the processing element is configured to determine a 3D position and radial velocity for a signal reflection received from the receivers.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
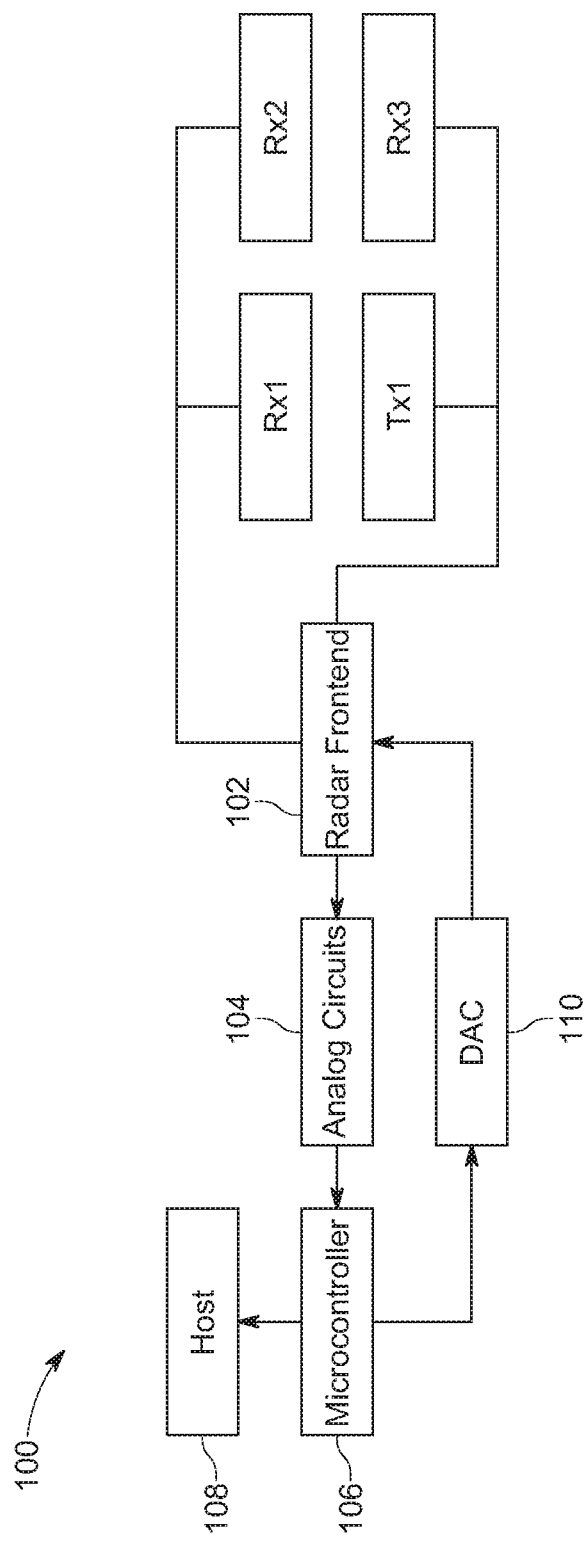
FIG. 1 shows example components of a radar based system for user interaction in accordance with various embodiments.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "performing" or "executing" or "transforming" or "determining" or the like, refer to the action and processes of an integrated circuit (e.g., computing system 1800 of FIG. 18), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments allow for user hand gesture recognition thereby allowing users to interact with computing devices in a natural manner. Improved accuracy and robustness to a variety of lighting conditions are also provided. Power consumption is also reduced. In some embodiments, a radar based system configured for short range (e.g., use in a vehicle) is provided that is able to determine the 3D position and radial velocity of moving objects (e.g., portions of a hand) while consuming low power and operating in a variety of lighting conditions (e.g., sunlight and darkness). Embodiments are able to function with high accuracy without being affected by wind and sound and with low interference from other devices.

Embodiments allow for touchless interfacing with computing, information, entertainment, and control systems. For example, a user taking his or her eyes off the road while driving to push a button on a car stereo can be dangerous. This can be particularly dangerous if the user is not familiar with the car he or she is driving, e.g., a rental car. Embodiments can be used in a variety of vehicles including, but not limited to, wagons, bicycles, motor vehicles (e.g., motorcycles, cars, trucks, buses), railed vehicles (e.g., trains, trams), watercraft (e.g., ships, boats), aircraft and spacecraft. Embodiments allow a user to continue looking ahead while driving and use a single hand to perform a gesture to control various systems. The gestures can be used to control a variety of features including, but not limited to, changing the volume, changing the song playing, changing the radio station, opening a sunroof or moonroof, accepting a call, reading a text message, dismissing a text message, etc.

Embodiments can further monitor health conditions including, but not limited to, respiration and heart rate. For example, heart rate detection could be used to monitor for emergency health conditions, e.g., a heart attack. It is noted that embodiments are well suited for other environments beyond vehicles including, but not limited to, a watch, a tablet, a phone, or any mobile device. Embodiments are further well suited for use in conjunction with other sensors (e.g., depth and camera sensors).

Embodiments can use a wide angle field of view with high range resolution. Based on the micro-Doppler effect, velocities of different parts of a hand can be measured due to the hand behaving like a non-rigid object. The reflections of the radar signal by different parts of the hand can be localized in space and their parameters estimated for gesture recognition.

Human to machine interfaces have become important in a variety of areas. For example, intelligent driver assistance systems have become important in the automotive industry. A smart user interface that tracks and recognizes a driver's hand gestures is desirable because it reduces distraction from having to find and press a physical button or rotate a knob. Hand gesture sensing using traditional computer vision techniques can be challenging because of a wide variety of lighting conditions, e.g., inside a car. A radar device (e.g., with short range) can provide additional information, including the location and instantaneous radial velocity of moving objects. Embodiments include a novel end-to-end (e.g., hardware, interface, and software) short range Frequency-Modulated Continuous-Wave (FMCW) radar-based system designed to effectively detected and recognize dynamic hand gestures. In some embodiments, an effective method for selecting the parameters of the FMCW waveform and a method for jointly calibrating the radar system with a depth sensor are provided. Embodiments thus provide reliable and robust performance.

Hand gestures are a natural form of human communication. In automobiles, a gesture-based user interface can improve driver's safety. It allows drivers to focus on driving while interacting with the information and entertainment or infotainment or control systems (e.g., air conditioning) in the car. A short-range radar sensor can add extra modalities to gesture tracking/recognition systems. One of these modalities is the instantaneous radial velocity of the driver's moving hand. Embodiments including the radar based system are advantageous based on: 1) robustness to lighting conditions as compared to other sensors; 2) low computational complexity due to direct detection of moving objects; and 3) occlusion handling because of the penetration capability of electromagnetic (EM) waves. For example, radar can penetrate through plastic and fabric (e.g., clothing).

Radar (RAdio Detection And Ranging) is an active sensor which continuously transmits EM waves and receives a part of the reflected signal. The radial velocity, range, and angle-of-arrival signals can be estimated by analyzing the dynamics of the received signal. The estimation of the time delay for traveling to and from an object is used for range (e.g., depth) estimation. The resolution is defined by the bandwidth of the system. A radar typically uses a lower frequency than depth sensors. The radar can be used to estimate the radial velocity from the Doppler's shift of the signal. Unlike other sensors, a radar is not negatively impacted by sunlight or other light sources.

A continuous wave radar continuously emits EM waves, and measures the amplitude and the phase difference of the transmitted and received signals. A continuous wave radar estimates both the amplitude and the phase of the received signal. If an object is not moving, the phase difference remains constant. If an object is moving the distance to the object changed and the phase changes. Thus, the motion of a non-rigid body causes a unique frequency modulation of the radar signal. A continuous wave radar has a lower cost, a lower power consumption, and a lower output power as compared to a pulse radar which transmits a pulse, and measures the time of traveling to and from an object.

Prior work in hand gesture recognition primarily used depth and optical sensors. Optical sensors do not provide accurate depth estimation and depth sensors can be unreliable (e.g., outdoors) where sunlight corrupts their measurements. Time-of-flight (TOF) depth and radar sensors can be similar in that they both measure the delay of the signal traveling to and from the object. However, radar sensors operate at lower frequencies, which allows for the estimation of the phase of the wave and consequently the Doppler's shift. The use of radar-like sensors for gesture sensing has been studied previously. However, in prior work the hand was modeled as a single rigid object. Embodiments do not model the hand as a single rigid object but rather as a non-rigid object. This allows embodiments to perceive the hand as a multi-scatter object and to capture its local micro-motions.

Figure 4:
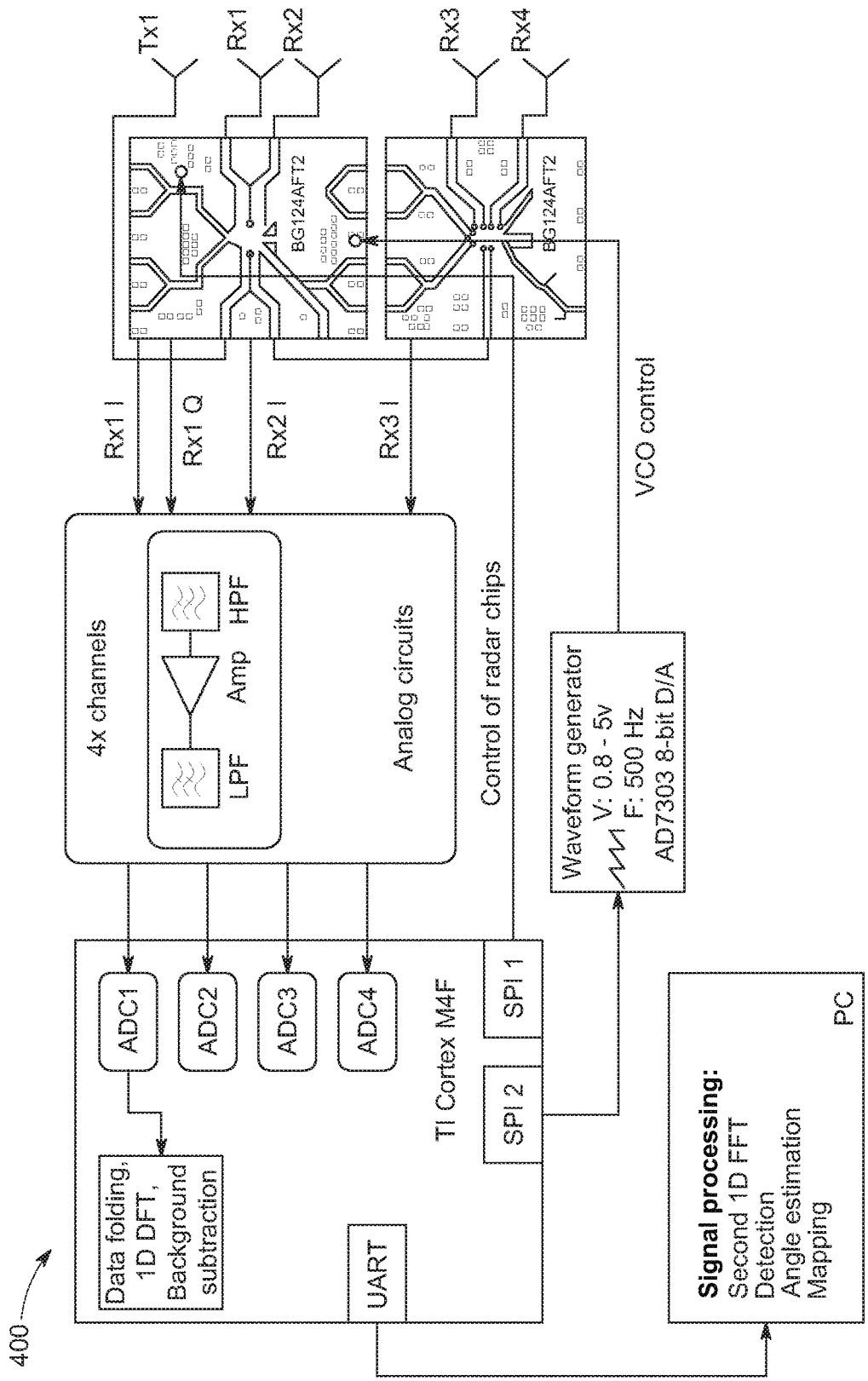
FIG. 4 shows example components used to implement a radar based system for user gesture based interaction in accordance with various embodiments.
Figure 6:
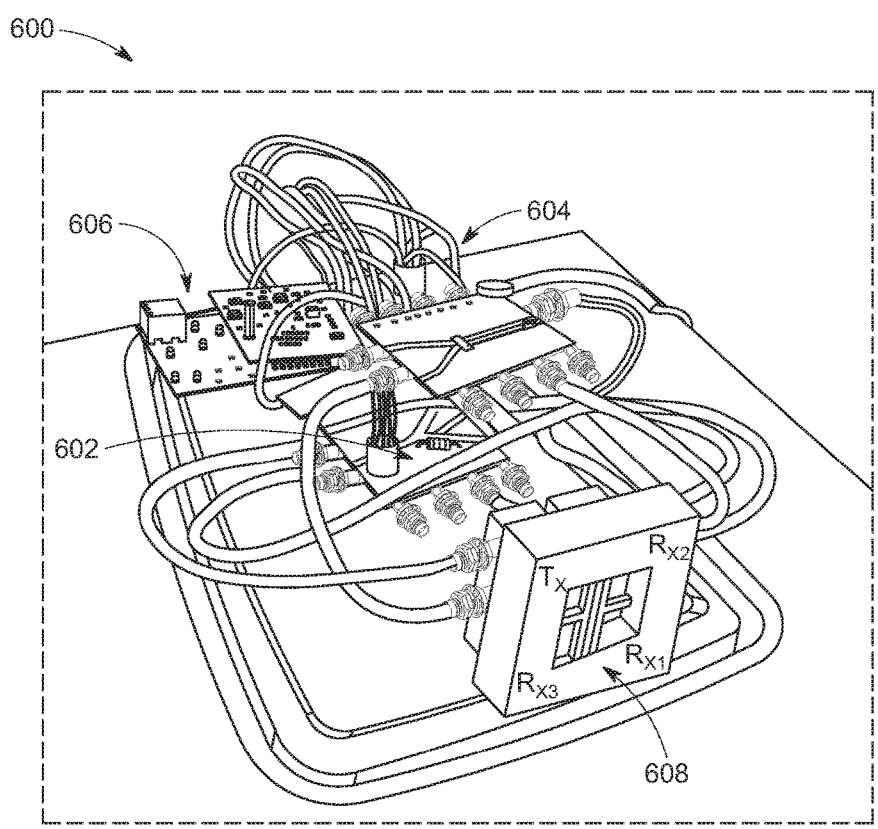
FIG. 6 shows an example image of a radar based system in accordance with various embodiments.

Embodiments include a novel end-to-end (hardware, interface, and software) short range radar-based system designed and prototyped to effectively measure dynamic hand gestures (e.g., FIGS. 1, 4, and 6). The system performs gesture recognition based on a hand behaving as a non-rigid object. In the context of dynamic gesture recognition, a hand gesture produces multiple reflections from different parts of the hand with different range and radial velocity values that vary over time. Due to this, different dynamic hand gestures produce unique range-Doppler-time representations which can be used to recognize the gestures.

In some embodiments, an FMCW radar with multiple receivers is used for hand gesture sensing. Embodiments can estimate the range and radial velocity of the scattering objects and the angle of arrival from objects that are spatially separated in the range-Doppler map. The information from the mono-pulse FMCW radar can be fused with depth sensors, because they provide spatial information of the object in 3-dimensions (3D). In some embodiments, three radar receivers are used and the mono-pulse technique is used for estimating the azimuth and elevation angles of moving objects, which enables estimation of the spatial location of objects and their radial velocity.

Some embodiments are configured for operation inside an automobile using radar principles adapted for the short range (e.g., ≤1 m). Embodiments may be part of a multi-sensor system. For example, embodiments may be part of the multi-sensor system described in non-provisional patent application, Ser. No. 15/006,525, entitled "MULTI-SENSOR SYSTEM AND METHOD FOR USER INTERFACE," with filing date Mar. 3, 2016, and is hereby incorporated by reference in its entirety.

FIG. 1 shows example components of a radar based system for user interaction in accordance with various embodiments. FIG. 1 depicts an example radar system 100 including three receivers Rx1, Rx2, and Rx3 and a transmitter Tx1. The transmitter Tx1 sends out frequency modulated signals which reflect back from various parts of a hand and other objects nearby. The signals thus scatter back with a lower amplitude and are received by the receivers Rx1, Rx2, and Rx3.

The receivers Rx1, Rx2, and Rx3 may be co-located (e.g., in close proximity) or may be spatially distributed. For example, the receiver Rx1 may be located adjacent to vents on either side of a dashboard of a car. The receivers and transmitter may further be located behind plastic (e.g., in a car dashboard). In some embodiments, the receivers Rx1, Rx2, and Rx3 and transmitter Tx1 are part of a semiconductor chip (e.g., 7 mm×7 mm).

In some embodiments, pairs of receivers are used for elevation and azimuth angle estimation. A pair of horizontally positioned receivers can be used for azimuth estimation. A pair of vertically positioned receivers can be used for elevation angle estimation. It is noted that more than three receivers and more than one transmitter can be used. For example, more receivers may be used to improve a signal to noise ratio. Embodiments can include multiple-input and multiple-output (MIMO) systems.

The system 100 is further able to detect an angle of an object using phase comparison. The phase comparison may be based on the predetermined or known locations of the receivers (e.g., Rx1, Rx2, and Rx3).

For example, using two receivers the system 100 can estimate the angle of a moving surface based on the phase difference between the signals at the two receivers. In order to estimate the angle for the azimuth and the elevation, three receiving antennas and phases comparisons are used.

In some embodiments, the receiver antennas can be designed to ensure that signals are not received from ambiguous angles. An unambiguous angle may be defined by $$\theta_{max} = \pm a\sin\left(\frac{\lambda}{2d}\right),$$

where $\lambda$ is the operating frequency of the radar, and d is the distance between centers of two receivers.

In some embodiments, the unambiguous angle is ±40° vertical and ±25° horizontal. Some embodiments may use one or more waveguide antennas and/or one or more patch antennas. In some embodiments, the radiation pattern of the antenna is ±60° vertically and ±45° horizontally. In some embodiments, measurement and processing is performed within a 30 ms timeframe.

The receivers Rx1, Rx2, and Rx3 and the transmitter Tx1 are communicatively coupled to the radar frontend 102. The radar frontend 102 controls the signals transmitted by the transmitter Tx1. In some embodiments, the transmitted signal is a frequency modulated continuous wave (FMCW). The radar frontend 102 can further control signal generation, signal modulation, demodulation, and amplification (e.g., low noise amplification). In other embodiments, the radar frontend 102 uses a 24 GHz carrier frequency. Embodiments may support a range of 10 GHz-200 GHz. A variety of modulation techniques may be used including, but not limited to, amplitude, frequency, phase, pulse, M-code, etc.

In some embodiments, the radar frontend 102 includes components for signal generation, a voltage control oscillator (VCO), control by a serial peripheral interface (SPI) bus, mixing of transmission (Tx) and receiving (Rx) signals, and low noise amplifiers. In other embodiments, the radar frontend 102 may include an Infineon BGT24MTR2 chip. In one embodiment, an Infineon BGT24MR2 chip can be used for an extra receiving channel (e.g., FIG. 4).

The radar front end 102 of system 100 thus transmits a modulated wave, receives reflections from objects and compares the modulated transmitted and received waves to determine the dynamics of the objects that are moving. The radar frontend 102 does demodulation. The radar frontend 102 sends the difference between the modulated signal transmitted and the modulated signal received to the analog circuits 104. For example, the carrier signal can be subtracted from the received signal by the radar frontend 102. If the difference between the modulated signal transmitted and the modulated signal received is zero or substantially zero this is indicative that there are no moving objects. If there is a difference is not constant between the modulated signal transmitted and the modulated signal received, this indicates that there was movement and it is to be processed to determine the movement.

The analog circuits 104 are configured to filter and amplify the signals received from radar frontend 102. In some embodiments, the analog circuits 104 provide filters and an invertible amplifier using an operation amplifier with a single power supply. In other embodiments, the parameters of the analog circuits include a cut-off frequency of 40 kHz, an amplifier of 15 dB, and are configured to reject objects beyond 1 m. The analog circuits 104 may amplify the baseband demodulated signal and filter the signal for short range operation (e.g., ≤1 m).

The microcontroller 106 can do preprocessing of the signals received from the analog circuits 104 before sending the signals/data to the host 108. In some embodiments, the microcontroller 106 performs sampling, filtering, and signal transmission to the host device 108.

The microcontroller 106 can perform signal sampling of each of the in phase (I) and quadrature (Q) channels for each of the receivers. In some embodiments, the microcontroller samples the I and Q channels for a first receiver (e.g., Rx2) and samples I channels for a second and third receivers (e.g., Rx1 and Rx3). It is noted that sampling in this manner can simplify the number of circuits and the number of channels that are sampled. The sampling of I and Q channels for one receiver and the I channels for two receivers facilitates determining the elevation angle and azimuth angle for each signal. In other words, the I channels of a first pair of receivers are used to determine the elevation angle and the I channels of a second pair of receivers are used to determine the azimuth angle. The sampling of I and Q channels from a signal receiver further allows determining of whether the object is moving forward or backward based on the estimated radial velocity.

In some embodiments, the microcontroller 106 is a programmed TI Tiva Cortex M4 microcontroller. The pre-processing can include static background subtraction (e.g., via a moving target indication (MTI) filter), 1D fast Fourier transform (FFT) and package creation for transmission to the host 108 (e.g., via FT232R UART-to-USB chip or any other hardware to exchange information between devices). In some embodiments, the system 100 can be configured to consume <12 mW of power from a USB port.

In some embodiments, the microcontroller 106 can include a radar chip control (e.g., enable the radar and power control) configured for: sampling four channels at 20 kHz (e.g., down sampled from 250 kHz), modulation signal (e.g., saw wave) generation through an external DAC, background subtraction (e.g., removing contributions from stationary objects), encoding of data, and transmitting (e.g., over serial to a USB port) data to a host (e.g., computing system). In other embodiments, a triangular wave or any other modulation signal is used. The background subtraction removes signals that are reflected from stationary objects which are the same from one signal transmission or sweep to the next. For example, the background subtraction can remove reflected signals received from a car seat and/or a headrest.

The host 108 may be a computing system or any computational node. In some embodiments, the host 108 can estimate a range-Doppler map, detect any objects via a constant false alarm rate (CFAR) detector, estimate the 3D position and radial velocity of the objects, register the radar data to the depth and color images of a sensor (e.g., a DS325 SoftKinetic), and/or recognize a gesture. The system 100 may be part of a multi-sensor system that for gesture recognition uses a trained deep neural network (DNN) classifier executing on a GPU, with red green blue (RGB), depth, and radar velocity data for a hand region inputs. In some embodiments, the host 108 processes the signal data by execution of software. The host 108 may estimate the angle of elevation and the azimuth for each moving object.

In some embodiments, the host 108 determines one more commands associated with detected gestures that may be determined and communicates the one or more commands to another system. For example, a command to change the radio station may be determined based on a detected gesture and the command is transmitted to a radio system.

The digital-to-analog converter (DAC) 110 is configured to control the radar front end 102 to enable the generation of modulation signals used for sensing objects.

In some embodiments, the radar based system 100 can estimate the range (e.g., depth) at a regular grid with resolution based on bandwidth. In some embodiments, the resolution is 4 cm. The radar based system 100 can further estimate the Doppler or radial velocity at the regular grid with the resolution based on observation time (e.g., frame rate). In other embodiments, the Doppler resolution is 0.04 m/s. The radar based system 100 may further estimate the angle of arriving (e.g., azimuth and elevation) with the resolution based on the signal-to-noise ratio (SNR).

The system 100 can be used in intelligent user interfaces, e.g., in car, and for human monitoring (e.g., driver monitoring). The system 100 is: 1) robust to ambient illumination ranging from bright sunlight to low light at night; 2) has lower cost and lower computational complexity than other sensors; and 3) can handle occlusions as the radar signal can penetrate opaque materials (e.g., plastics and clothes). The system 100 can be employed individually, or in conjunction with imaging sensors for intelligent automotive UIs, e.g., for dynamic hand gesture recognition, disambiguation of driver's vs. passenger's gestures, and human heart rate monitoring. The heart rate monitoring detection can be used for driver state monitoring and critical health event detection.

In some embodiments, the system 100 uses a frequency-modulated continuous-wave radar with multiple co-located receivers. In other embodiments, the system 100 operates in International Telecommunication Union (ITU)'s permitted wavelength band of 24±2 GHz. The system 100 measures a 4D vector (x, y, and z+ radial velocity) for each detected moving object within its field of view (FOV). The system 100 can further measure the velocity of a moving target object (e.g., a hand) using the Doppler effect. The range between the sensor and the object is computed from the beat frequency shift caused by the time delay of the radio wave traveling to and from the object with the range and velocity forming a range-Doppler map, where each moving object is localized. In some embodiments, using three receivers, the system 100 can estimate the azimuth and elevation angles of moving objects by measuring the pair-wise phase differences between the signals received by the various receivers.

In some embodiments, the system 100 measures range with a resolution of 4 cm and bi-directional velocity at a resolution of 0.04 m/s. The spatial (x, y) coordinates are estimated with an accuracy of 1° with a coverage of ±45° and ±30° in the horizontal and vertical directions, respectively.

In an example embodiment, with radar data for a hand region, the system 100 recognized ten dynamic gestures: translational (up, down, left, and right), pointing (left, right), rotational (clockwise, counter-clockwise) and two shaking gestures with 91.3% accuracy in real time on desktop computer (e.g., Linux), as described in non-provisional patent application, Ser. No. 15/060,525, entitled "MULTI-SENSOR SYSTEM AND METHOD FOR USER INTERFACE," with filing date Mar. 3, 2016, and is hereby incorporated by reference in its entirety. The combination of radar data of the system 100 with depth and RGB data resulted in an accuracy of 95%. The system 100 can operate in all illumination conditions. The system 100 measures the azimuth and elevation angles of the moving object using multiple (e.g., three) receivers in addition to the range and instantaneous radial velocities.

Figure 2:
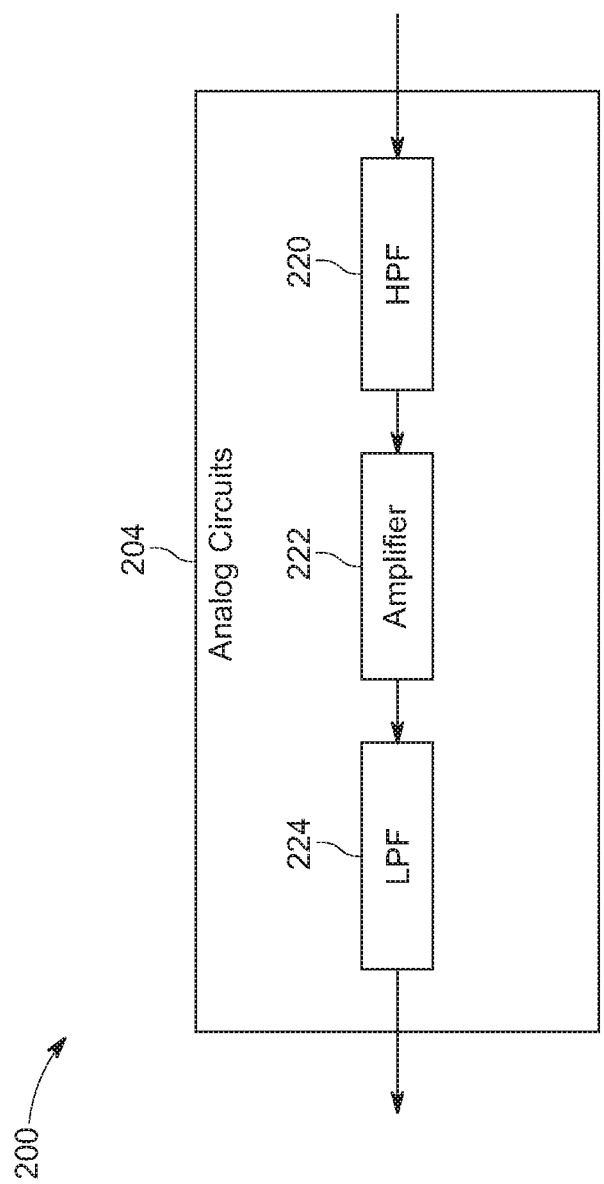
FIG. 2 shows example components of exemplary analog circuits in accordance with various embodiments.

FIG. 2 shows example components of exemplary analog circuits in accordance with various embodiments. FIG. 2 depicts the flow of signals through various components of analog circuits 204 (e.g., analog circuits 104). The analog circuits 204 include a high pass filter (HPF) 220, an amplifier 222, and a low pass filter (LPF) 224.

The HPF 220 is configured to remove interference between transmit and receive channels due to the transmitters and receivers being in close proximity. The amplifier 222 is configured to amplify the reflected signals received from objects which can be much lower in amplitude than other signals, e.g., transmitted signals. The amplifier 222 can thus enhance the signals received from objects. In some embodiments, the amplifier 222 includes a 15 dB amplifier. In other embodiments, the amplifier 222 ranges from 0-60 dB in amplification.

The LPF 224 is configured to remove clutter noise, range ambiguity, and/or signals that are out of the desired range (e.g., 1 meter). The signals output from the analog circuits can include a superposition of each of the signals received after reflecting from object within range of the receivers.

The signals output from the analog circuits can include an analog version of frequency modulated and reflected signals of the original modulated signals transmitted by the transmitters (e.g., of system 100). The signals are sent from the LPF 224 to a microcontroller (e.g., microcontroller 106).

Figure 3:
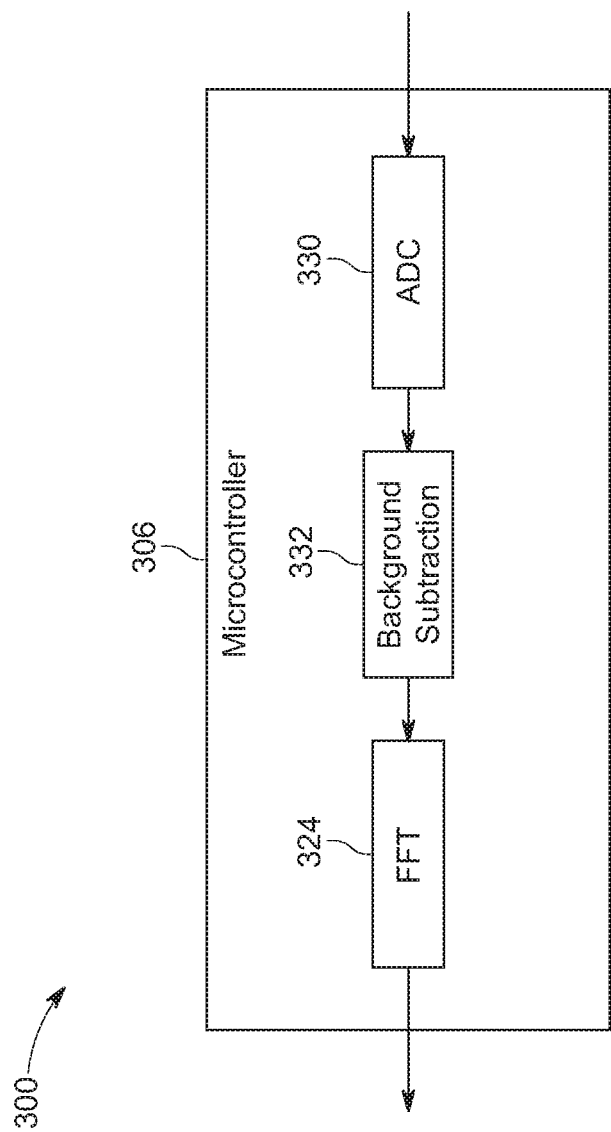
FIG. 3 shows example components of a microcontroller in accordance with various embodiments.

FIG. 3 shows example components of a microcontroller in accordance with various embodiments. FIG. 3 depicts the flow of signals through various components of a microcontroller 306 (e.g., microcontroller 106). The microcontroller 306 include an analog-to-digital converter (ADC) 330, a background subtraction module 332, and a FFT module 324.

The ADC 330 samples the analog signals received from the analog circuits and converts the signals to one or more digital signals. The background subtraction module 332 removes reflected signals received from stationary objects.

The FFT module 324 performs a fast Fourier transform on the signals and sends the signals to a host device (e.g., host 108). In some embodiments, the FFT is performed over a range to transform stochastic measurements into data about the range beams of the signals. The output of the microcontroller 306 via the FFT module 324 can include a set of positions of moving objects within range of the receivers. The signals output of the microcontroller 306 can include a superposition of each signal from each moving object.

In some embodiments, the microcontroller 306 can further perform parsing and coding of the signal data for transmission to the host 108. The microcontroller 306 can support asynchronous or synchronous transmissions. For example, the data may be parsed and coded for transmission via an universal asynchronous receiver/transmitter (UART). In some embodiments, 12 bits per point are transmitted in 16 bit data structures.

FIG. 4 shows example components used to implement a radar based system for user interaction in accordance with various embodiments. FIG. 4 depicts a block diagram of an example short-range radar system 400 for in-vehicle gesture sensing. The system 400 is based on a radar frontend chip (e.g., BGT24MTR12 chip from Infineon Technologies of Milpitas, Calif.). In some embodiments, a Cortex M4F microcontroller by Texas Instruments (TI) Incorporated of Dallas Tex. is used for sampling and signal processing.

In some embodiments, the system 400 uses a FMCW radar with multiple receivers. For example, the system 400 can operate in K-band with a central frequency of 25 Ghz and bandwidth of 4 Ghz. The system 400 can measure a 4D vector (e.g., x, y, z and radial velocity) of each moving object that is detected within the field of view (FOV). The system 400 can employ the Doppler Effect to measure the velocity of the target moving object, e.g., a hand. The system 400 then computes the range between the sensor and the object by measuring beat frequency which is proportional to the time delay of the signal traveling to and from the object. The range and velocity data are used to form a range-Doppler map (RDM), where each moving object is localized. Using three receivers, the azimuth and elevation angles of the moving objects are estimated by measuring the pair-wise phase differences between the signals at multiple receivers.

In some embodiments, the frontend interface of the system 400 uses the frontend radar chip (e.g., Infineon BGT24MTR12 chip) generates the signal and frequency modulates and demodulates the signal. The system 400 amplifies and demodulates the baseband modulated signal via custom analog circuits configured for operation in a short range (e.g., ≤1 m). The system 400 samples the analog signals, e.g., at a rate of 40 Khz and pre-processes the samples with a (programmed) microcontroller (e.g., TI Tiva Cortex M4F). The pre-processing can include static background subtraction (e.g., by a moving target indication (MTI) filter), 1D FFT, and package creation for transmission to a host machine (e.g., by UART-to-USB chip). Some embodiments of system 400 may consume less than 1 W of power from a USB port, but the power consumption can be significantly reduced for a packaged product (e.g., up to 12 mW). In some embodiments, the host machine estimates the RDM, detects moving objects (e.g., via constant false alarm rate (CFAR) detection), estimates the 3D position and velocity of the moving objects, registers the radar data to other sensors, and performs application-specific operations.

Figure 5:
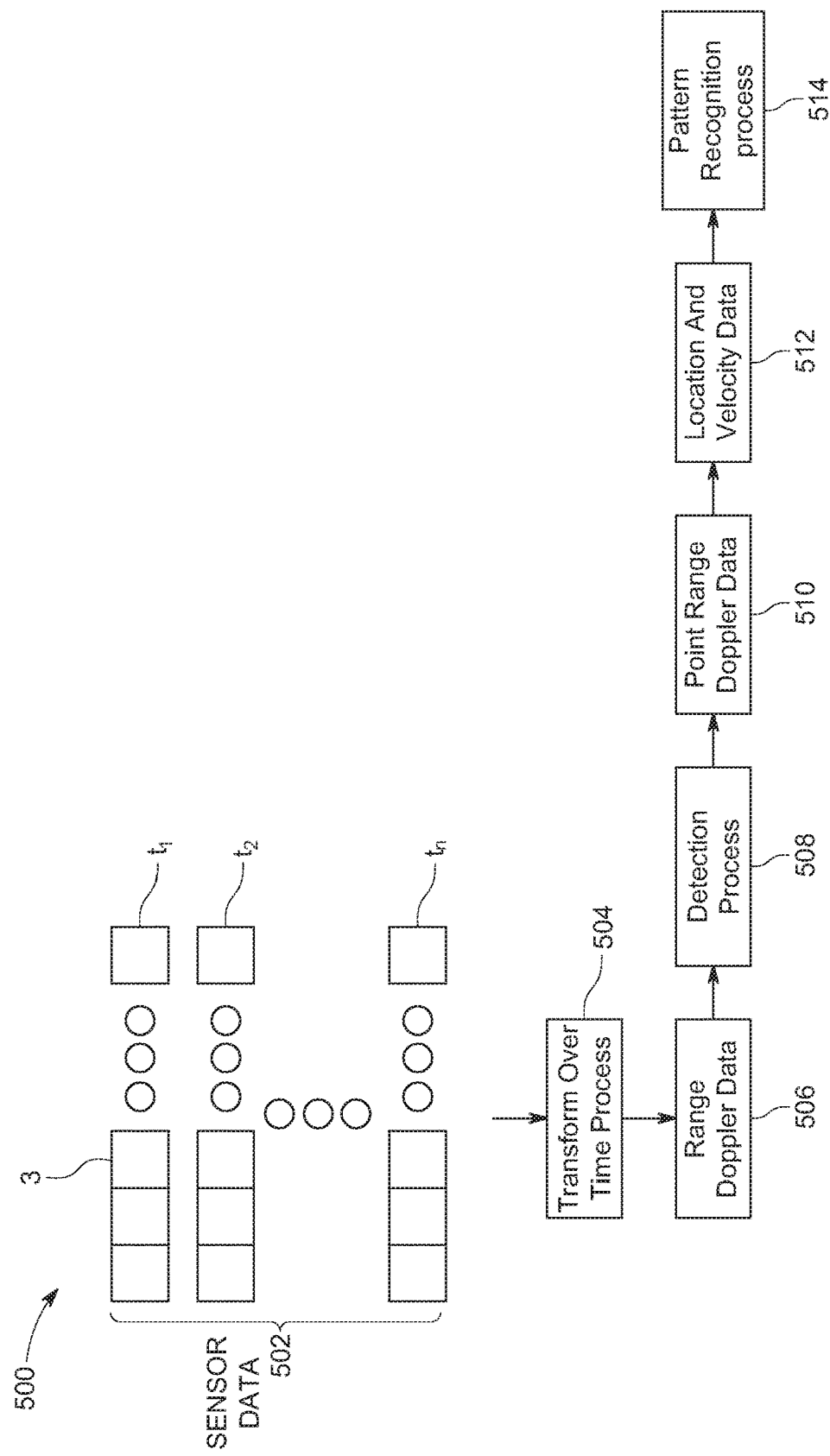
FIG. 5 shows an example dataflow of data processing in accordance with various embodiments.

FIG. 5 shows an example dataflow of data processing in accordance with various embodiments. FIG. 5 depicts the data flow during the processing of signals by a radar based system (e.g., radar based system 100).

In some embodiments, a microcontroller (e.g., microcontroller 106) can output (e.g., via the FFT module 324) range profiles as sensor data 502 which includes vectors of fixed lengths determined based on the maximum range resolution of the system. In other embodiments, for a system with three receivers, three range profiles are received at each sweep. For example, a respective vector is output by the each of three receivers for each sweep. Each element in vector includes a complex number and an amplitude. The phase can be used to the find the angle of elevation of a moving object. The vectors of the sensor data 502 thus show a distribution of each object for which range beams have been received.

In some embodiments, the vectors of sensor data 502 have 32 elements per sweep or signal sweep with each sweep occurring on 2 ms basis and a vector is received from for each receiver. The host (e.g., host 108) may thus receive 500 vectors each with 32 elements, including complex numbers, times three receivers each second. The complex numbers in each of the vectors represent the frequency response.

For example, if a user's hand is located 70 cm out from the radar and corresponds to beam 3, then the amplitude for the associated vector element will have a local maxima for beam 3 which represents the amplitude of the frequency response. For multiple objects, there will be multiple amplitude values in the vectors of the sensor data 502. The amplitudes will move over time in each of the sweeps as an object (e.g., hand) moves.

The sensor data 502 is processed with transform over time process 504 (e.g., with a FFT) which takes the analog signal in the time domain and converts it into the frequency domain. Other transformations may also be used including super resolution techniques and wavelets. In some embodiments, a matrix is formed of the sensor data 502 (e.g., FIG. 8). The output of the transform over time process 504 is range-Doppler data 506.

Figure 9:
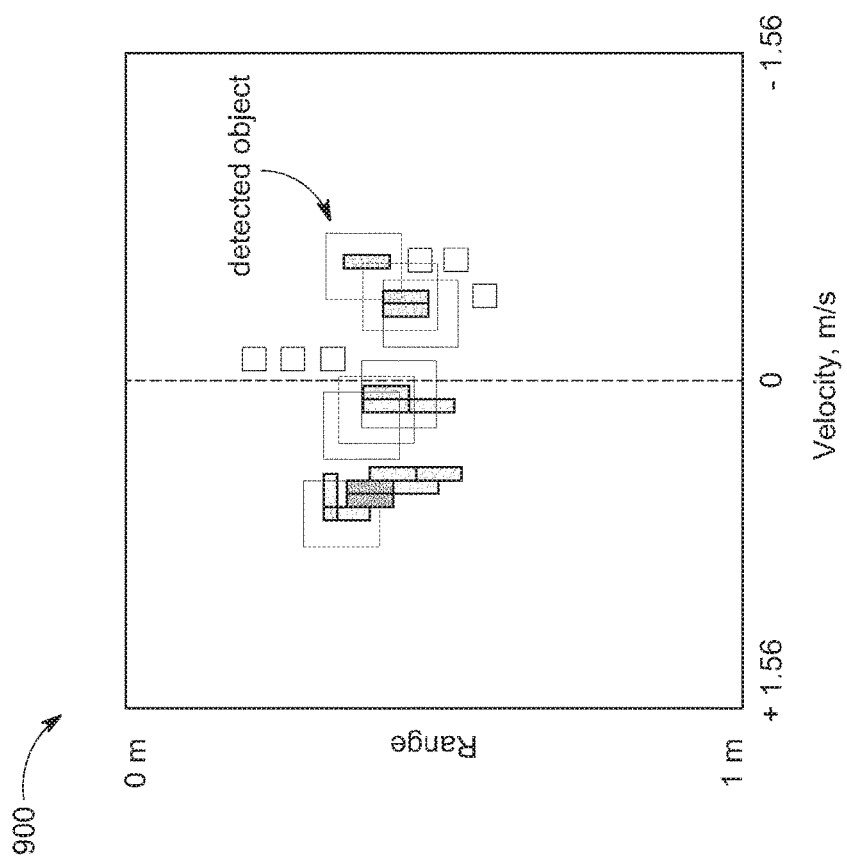
FIG. 9 shows an example range-Doppler map in accordance with various embodiments.

In some embodiments, the range Doppler data 506 may be represented at a range Doppler image (RDI) (e.g., as a matrix) with range on one axis and velocity on the other axis for each receiver. The range Doppler image shows the reflections received from moving objects. FIG. 9 depicts an example range Doppler image.

Detection process 508 performs object detection on the range Doppler data 506. The detection process 508 may include a variety of radar based detection of objects techniques including, but not limited to constant false alarm rate (CFAR) detection.

The detection process 508 outputs points range Doppler data 510. The points range Doppler data 510 includes range and Doppler positions of each object (e.g., a set of points with range and Doppler values). For example, the range and Doppler measures for a point of an object may be a range of 16 cm and a Doppler value or velocity of 0.8 m/s. In some embodiments, a phase comparison may be applied. The phase comparison compares pairs of the Doppler range images from each of the receivers and compares the phase measurement in order to estimate the angles (e.g., elevation and azimuth) of each object.

From the points range Doppler data 510, location and velocity data 512 is determined. The location and velocity data 512 can be represented as 4 dimensional vectors for each moving point (e.g., x, y, z and velocity). It is noted the use of three receivers (e.g., Rx1, Rx2, and Rx3) facilitates 3D location or point determination, while two receivers facilitates 2D location or point and a single angle (e.g., elevation or azimuth).

A pattern recognition process 514 may be performed on the location and velocity data 512 to determine one or more gestures that were performed. In some embodiments, the pattern recognition process 514 is performed with machine learning based on training and/or calibration data. In some embodiments, a deep neural network (DNN) performs the pattern recognition process 514. It is noted that the pattern recognition process 514 may be performed at a variety of points including on the sensor data 502 or on the range Doppler data 506.

FIG. 6 shows an example image of a radar based system in accordance with various embodiments. FIG. 6 depicts a prototype radar system 600 including four antennas 608 (Tx, Rx1, Rx2, Rx3), radar chips 606 (e.g., radar frontend 102), analog circuits 604 (e.g., analog circuits 104), and a microcontroller 602 (e.g., microcontroller 106). The system 600 is designed to operate in near real-time. The system 600 performs a full set of measurements (e.g., range, radial velocity, azimuth, and elevation) for spatially separated objects at a rate of 32 frames per second. The default output power for the radar may be reduced by 9 dB and be equal to 3 dBm.

Figure 7:
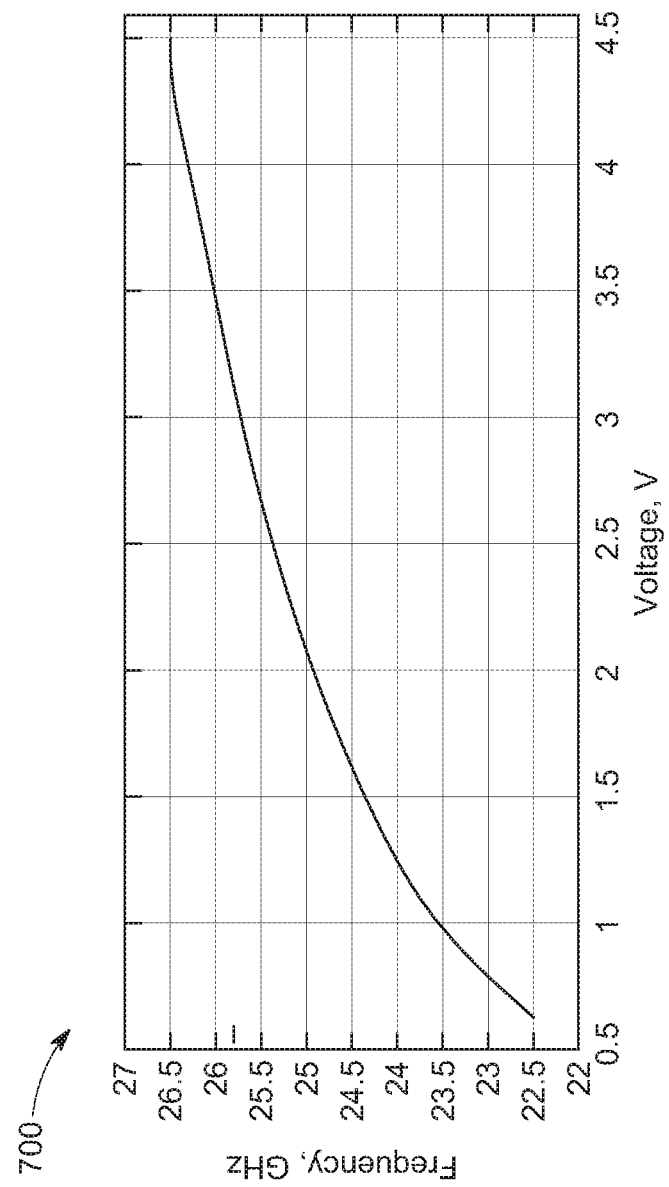
FIG. 7 shows an example voltage-frequency response of a radar frontend component of a radar based system in accordance with various embodiments.
Figure 10:
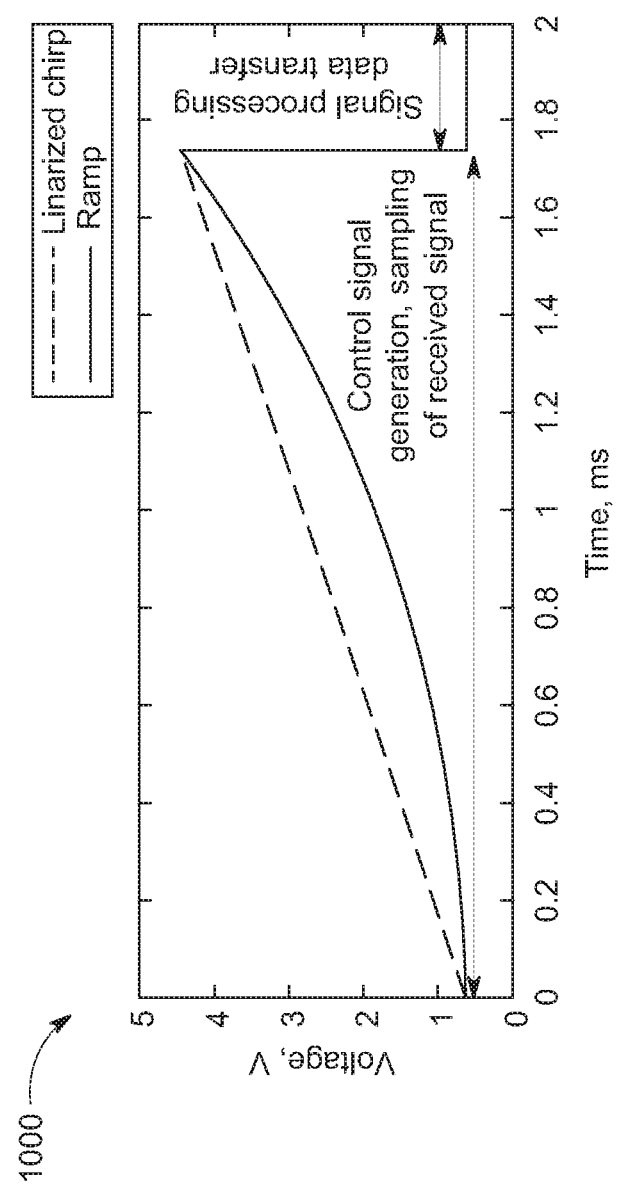
FIG. 10 shows an example linearized chirp used in accordance with various embodiments.

FIG. 7 shows an example voltage-frequency response of a component of a radar based system in accordance with various embodiments. FIG. 7 shows an example measured non-linear voltage frequency response of a radar frontend prior to chirp linearization. FIG. 7 depicts a non-linear voltage-frequency response of a voltage controlled oscillator (VCO) of a radar frontend (e.g., radar frontend 102). The radar frontend may be a BGT24MTR12 chip, as mentioned above. This non-linear voltage-frequency response may be common for VCOs but for correct operation of FMCW radar, the output of the VCO should be a signal with monotonically increasing frequency (e.g., with a constant first derivative). This can be achieved with a specially designed control signal, which compensates for the non-linearity of the voltage-frequency response. For example, the non-linear voltage-frequency-response may be approximated by a $5^{th}$ order polynomial and voltage values are calculated for the frequency output being monotonic between 22.5 and 26.5 Ghz. FIG. 10 shows the linearized chirp signal which was used for an example radar-based short-range gesture sensing.

Figure 8:
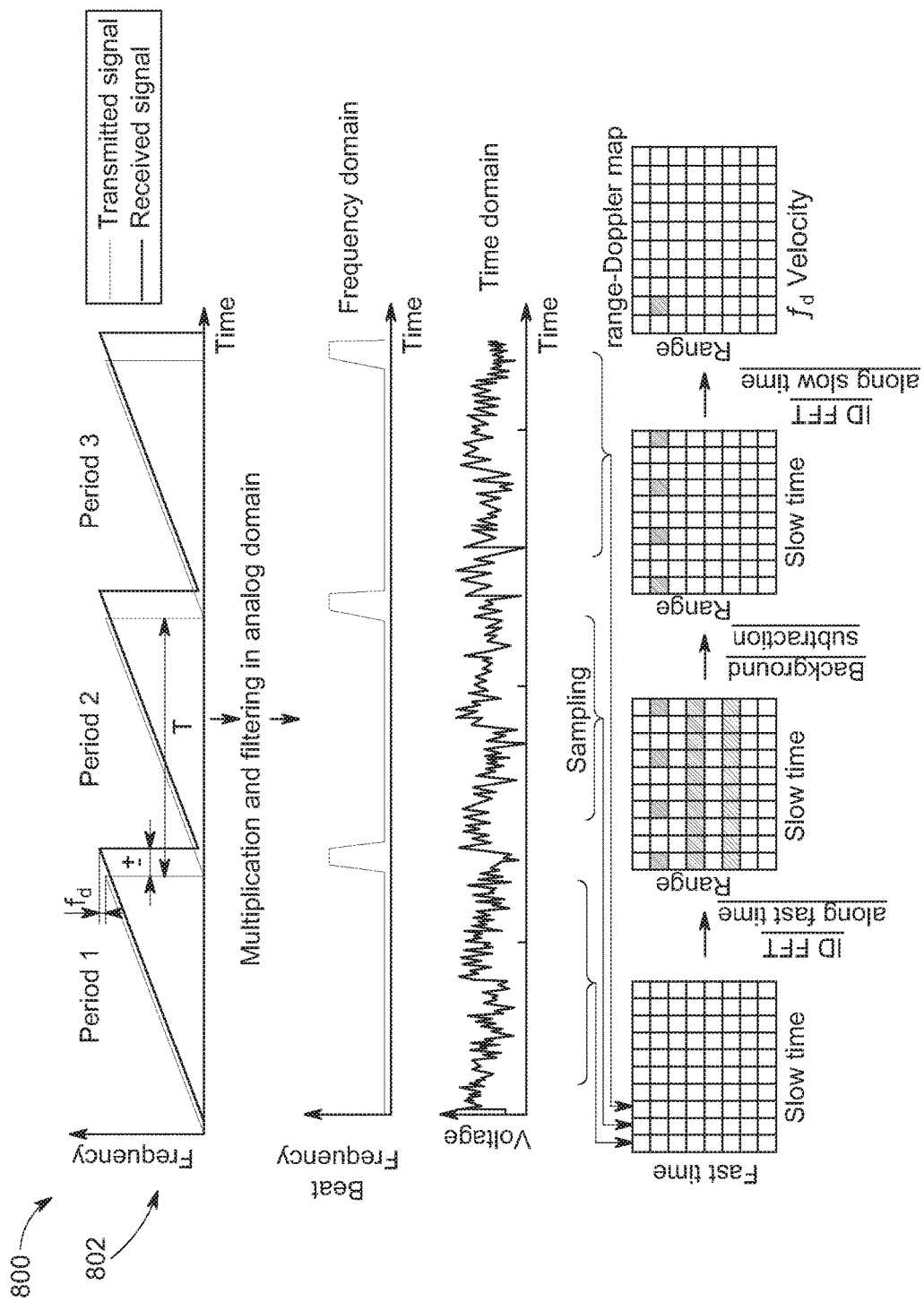
FIG. 8 shows an example of range-Doppler processing in accordance with various embodiments.

FIG. 8 shows example range Doppler processing in accordance with various embodiments. FIG. 8 depicts a scheme of range Doppler processing to measure the Doppler shift ($f_d$) and the time delay ($\tau$) caused by the motion of the object. The range and velocity of a moving object is estimated by processing the demodulated beat signal.

In the FMCW radar, the transmitted signal is frequency modulated with a periodic saw-wave (e.g., before linearization) function as shown in graph 802. The received wave is subject to a frequency shift (Doppler shift, $f_d$), and is also subject to a time delay $\tau$. The relative motion of the object with respect to and from the object causes the time delay (e.g., non-zero beat frequency). For saw-wave modulation, the frequency shift and beat frequency are coupled and may be difficult to separate for multiple objects.

Embodiments are configured to separate multiple objects with processing of range Doppler maps. A number of modulation periods (e.g., sweeps) are transmitted, multiplied by their responses, and the resulting signal is low-pass filtered. The resulting beat signal is further analyzed. In some embodiments, the resulting beat signal is organized in the form of a matrix with each column of the matrix including the beat signal of a single sweep. The signal is a superposition of reflections from multiple objects, and can have the form:

$$s(t, n) = \sum_{i=0}^{I} A^{(i)} e^{j(2\pi k \tau^{(i)} t + 2\pi f_d^{(i)} n + \phi^{(i)})}, \quad (1)$$

where $A^{(i)}$ is the amplitude of the received signal reflected by object i, k is the wave number, $\tau^{(i)}$ is the time delay caused by the signal propagation, $f_d^{(i)}$ is the frequency Doppler shift caused by the relative motion of the object, $\phi^{(i)}$ is a linear phase term, $\tau$ is the fast-time index (e.g., samples within a single sweep), and n is the slow-time index (e.g., index of the sweep's period). The 2D signal s(t,n) is of size L×N, where L is the number of samples in a single period of a single period of a sweep, and N is the number of sweeps considered for range-Doppler processing. For example, for a prototype N=32 and L=64.

The signal is transformed to the frequency domain by applying a 2D discrete Fourier transform:

$$S(p, q) = \sum_{n=1}^{N} \left( \sum_{t=1}^{L} s(t, n) e^{-j2\pi pt/L} \right) e^{-j2\pi qn/N} = \\ = \sum_{i=0}^{I} A^{(i)} \delta(p - w_f^{(i)}, q - w_s^{(i)}) e^{j\phi^{(i)}}, \quad (2)$$

where $\delta$ is the Dirac delta function, and $\tau_m$ is the time delay corresponding to the maximum range. Each $i^{th}$ reflector contributes, to the signal S(p,q), an impulse, in the ideal case, at position $$w_f^{(i)} = 2\pi k \tau^{(i)}; w_s^{(i)} = 2\pi f_d^{(i)} = 4\pi v^{(i)} \cos \theta^{(i)} / \lambda, \quad (3)$$

where $v^{(i)}$ is the velocity and $\theta^{(i)}$ is the angle between the radar's line of sight and the direction of motion of the object.

The signal S(p,q) of equation 2 can be referred to as a complex Range-Doppler Map (CRDM). The amplitude term of the CRDM, |S(p,q)|, is referred to as the Range-Doppler Map (RDM). The phase term can be used to estimate the angle of arrival.

The RDM shows the distribution of energy in each range and Doppler bin. From the RDM, moving objects present in the scene can be detected using the CFAR detector.

FIG. 9 shows example range-Doppler map (RDM) in accordance with various embodiments. FIG. 9 depicts a RDM of a moving hand. The squares indicate the detected objects. Since the hand is non-rigid, it appears a collection of objects in the RDM. The RDM shows successful detections for a moving hand. It is noted that while performing a gesture, a moving hand can be considered as a non-rigid object with moving parts that reflect the radar signal independently.

The angle of arrival of an object can be estimated by comparing the signal received at two receivers or from the CRDMs. The angle of arrival can be estimated by comparing the phases of signals received at two receivers based on the equation:

$$\theta = \arcsin\left(\frac{\lambda(\angle S_2(p,q) - \angle S_1(p,q))}{2\pi d}\right), \quad (4)$$

where z is the phase extraction operator, d is the physical distance (baseline) between the receiving antennas, and $S_1(p,q)$ and $S_2(p,q)$ are CRDMs at the two receivers.

In some embodiments with three receivers, one receiver is positioned in the middle and the other two are displaced horizontally and vertically with respect to the receiver in the middle. Based on these positions, the azimuth and elevation angles can be estimated. Together with the range measurement, the position of the object can be estimated in a spherical coordinate system. It is noted that the spatial position may be computed of only the objects detected in the RDM.

The maximum unambiguous angle can be computed with the phase technique defined as:

$$\theta_{max} = \pm\arcsin(\lambda/2d). \quad (5)$$

It follows that $$d \to \frac{\lambda}{2}$$

for the maximum FOV. This may not be always possible for real systems. For example, a prototype achieved the following unambiguous FOV $$\theta_{max}^{horizontal} = \pm 40°; \theta_{max}^{verical} = \pm 25° \quad (6)$$

by manually cutting the waveguide antennas to reduce the physical distance between them.

In some embodiments, the range resolution of the range-Doppler estimation is $$\Delta r = \frac{c}{2B},$$

where c is the speed of light and B is the bandwidth of the radar i signal. In some embodiments, the radar front end has bandwidth of 4 GHz and a range resolution of $\Delta r = 3.75$ cm.

The velocity resolution can be defined as $\Delta v = c/(2LTf_0)$, where L is the number of accumulated periods and $f_0 = 25$ GHz is the frequency of the carrier. For a selected L=64, the velocity resolution of $\Delta v = 0.04$ m/s.

The unambiguous range and velocity values may be equal to $r_{max} = cT/2$ and $r_{max} = c/(4Tf_0)$, respectively, where T is the modulation period. For sensing drivers' hand gestures the maximum distance of interest can be $r_{max} = 1.5$ m, which results in a modulation period of T>100 ns. Alternatively, assuming a maximum velocity of the hand to be 1.5 m/s, the modulation period is T≤2 ms. It is noted that it can be advantageous to selected a larger T, to avoid the need for high performance hardware. Thus, in some embodiments the chirp period is set to T=2 ms.

In some embodiments, the output of the radar is a demodulated signal referred to as the beat signal. The maximum frequency can depend on the maximum range as:

$$f_b = \frac{B2r_{max}}{Tc} \approx 19.5 \text{ KHz}. \quad (7)$$

Hence the sampling frequency of some embodiments can be $F_s \geq 39$ KHz. Some embodiments can include analog filters between the radar and the ADC module configured to reject frequencies $>f_b$.

The estimated frequency of the beat signal $f_b$ results can result in low performance requirements on components, e.g., analog filters and amplifiers. Additionally the sampling frequency $F_s$ be realized with low-cost microcontrollers (e.g., the TI Cortex M4F). The I and Q channels are samples for one of the receivers (e.g., Rx1 of FIGS. 1 and 6). For the other two receivers, only the I channels are sampled. The number of analog circuits needed and the amount of information transmitted to the host is thus reduced.

In some embodiments, digital signal processing (e.g., FIG. 11) for the radar is performed in two stages. In the first stage, the sampled signal is pre-processed on the microcontroller. In the second stage, remaining signal processing steps can be performed by a host (e.g., computing system).

In some embodiments, for increased efficiency, the tasks of control signal generation (e.g., for VCO through DAC) and sampling from the signal processing on the microcontroller are separated as shown in FIG. 10.

FIG. 10 shows example linearized chirp used in accordance with various embodiments. FIG. 10 depicts an example linearized chirp that includes two periods: the actual chirp and a silence period. The actual chirp is used for control signal generation and sampling. The silence period is used for signal processing and data transfer.

Since reflections from stationary objects mask the true reflections from a hand, an MTI filter can be applied to suppress the contribution from stationary objects. The sampled demodulated signal is filtered at each receiving channel by means of a running average filter as:

$$\hat{s}(t,n) = s(t,n) - B_n(p)$$

$$B_{n+1}(p) = B_n + \alpha \hat{s}(t,n), \quad (8)$$

where α is the smoothing factor (e.g., selected to be 0.01), and $B_n$ is the background model estimated at time index n. This background subtraction method has low memory and computational requirements, and can be implemented on a microcontroller.

In some embodiments, a first 1D Fourier transform along the fast-time axis is applied. This transformation results in range profiles, which may be sent to a host (e.g., computing system). The set of range profiles are compiled and a second 1D Fourier transform along the slow-time axis is performed to compute the RDM. The overlapping sets of range profiles are used to compute the RDM, which increases the Doppler resolution. A Gaussian fit may then be applied to neighboring cells in the RDM for range estimation of detected objects. This fitting allows sub-resolution accuracy.

Figure 11:
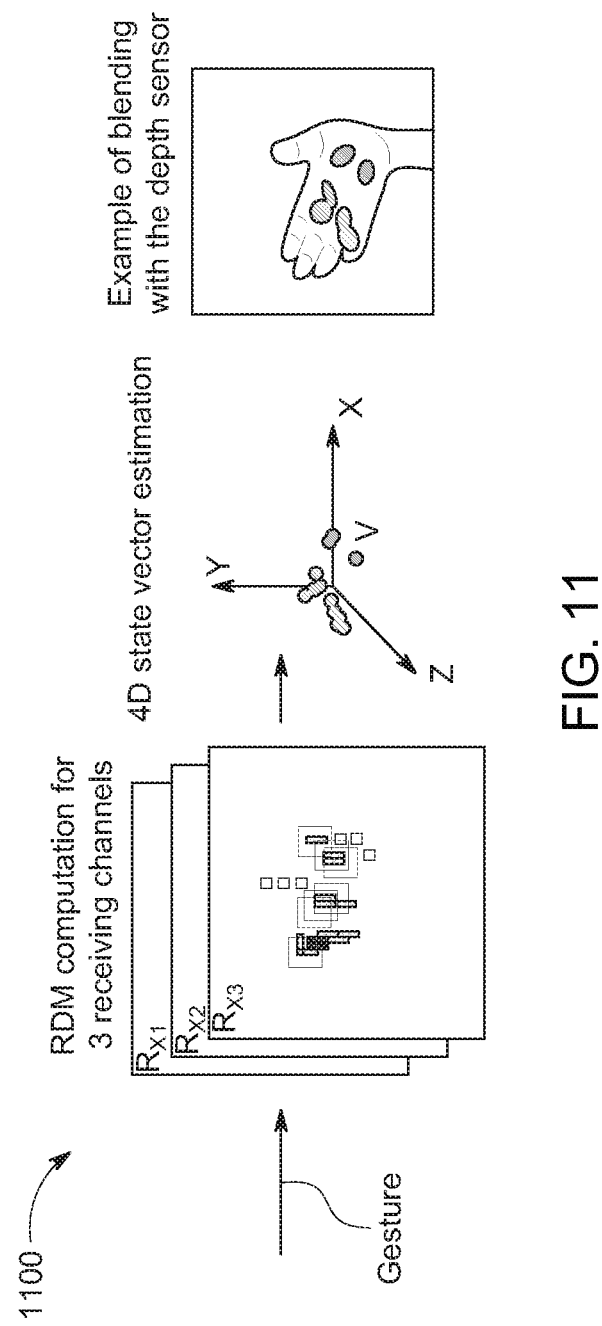
FIG. 11 shows an example processing radar data flow in accordance with various embodiments.

FIG. 11 shows an example processing data flow in accordance with various embodiments. FIG. 11 depicts the processing of radar gesture data as received by three receivers and estimating associated 4D state vectors. In some embodiments, the three receivers of the radar system receiving signals of a hand gesture. For each receiver, the RDM is estimated and moving objects are detected. Additionally, for each detected object, a 4D vector comprising spatial coordinates and radial velocity is estimated. In other embodiments, after calibration, the radar's measurements are projected on to a depth image (e.g., combined with data received from a depth sensor).

Embodiments of the radar system may be part of a larger multi-sensor system, which can include an RGB sensor and a depth sensor. Cross-sensor calibration enables information from multiple sensors to be registered and fused. Calibration can be performed after the relative positions of the sensors is fixed.

In some embodiments, two transformation models between 3D points measured by the depth and radar sensors may be used: linear and quadratic. For both models the transformation can be based on:

$$P*R+D, \qquad (9)$$

where $D=[X_d Y_d Z_d]^T$ is a 3D point measured by the depth sensor and P is a transformation (projection) matrix. For the linear model, $R=[X_r, Y_r, Z_r, 1]^T$ where the first three dimensions represent the 3D point measured by the radar and P is a matrix of coefficients of size 3×4. For the quadratic model, $R=[X_r, Y_r, Z_r, X_r^2, Y_r^2, Z_r^2, 1]^T$ and P is of size 3×7.

In some embodiments, the measures of the depth sensor (D) are transformed to world coordinates as:

$$\hat{X}_d = (X_d - c_x) * Z_d / f_x; \hat{Y}_d = (Y_d - c_y) * Z_d / f_y, \qquad (10)$$

where $f_x, f_y$ are the focal lengths of the depth camera, and $c_x, c_y$ are the coordinates of its principal point.

In other embodiments, estimating the matrix P can be based on observing the 3D coordinates of the center of a moving spherical ball of radius 1.5 cm with both the radar and depth sensors and estimating the best-fit transformation between the sensors using a linear least squares procedure.

In some embodiments, the depth camera is placed above radar sensor. The x axis may then be along the horizontal direction, the y axis is along the vertical direction, and the z axis is the optical axis of the depth camera. For example, a TOF depth camera (e.g., DS325 from SoftKinetic) may be used with a spatial resolution of 320×240 pixels, a depth resolution of ≤1 mm, and a FOV of 74°×58°.

Figure 12:
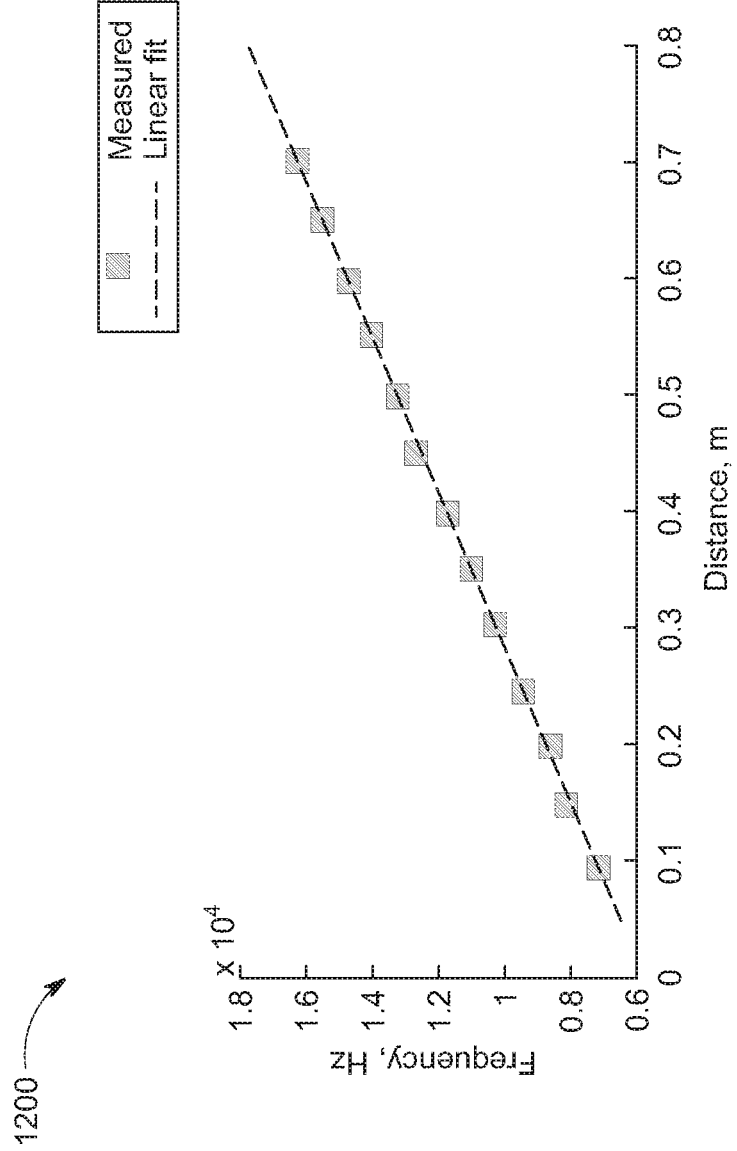
FIG. 12 shows an example beat frequency measurements in accordance with various embodiments.

FIG. 12 shows example beat frequency measurements in accordance with various embodiments. FIG. 12 depicts measurements of the beat frequency for different distances of a stationary metallic disk with a diameter of 0.18 m. In some embodiments, the background estimate was fixed according to equation 8. FIG. 12 illustrates the observed relationship between the beat frequency and the distance to the calibration disk. The strongly linear nature of this relationship demonstrates the high reliability of embodiments. The standard deviation of the distance measurements was 0.6 cm. An on-board microcontroller performed the measurements by averaging over a period of 2 seconds. The experiments indicate that the system provides reliable measurements of the distance. The radar systems operations were validated with measurements of a disk, a pendulum, and a hand.

Figure 13:
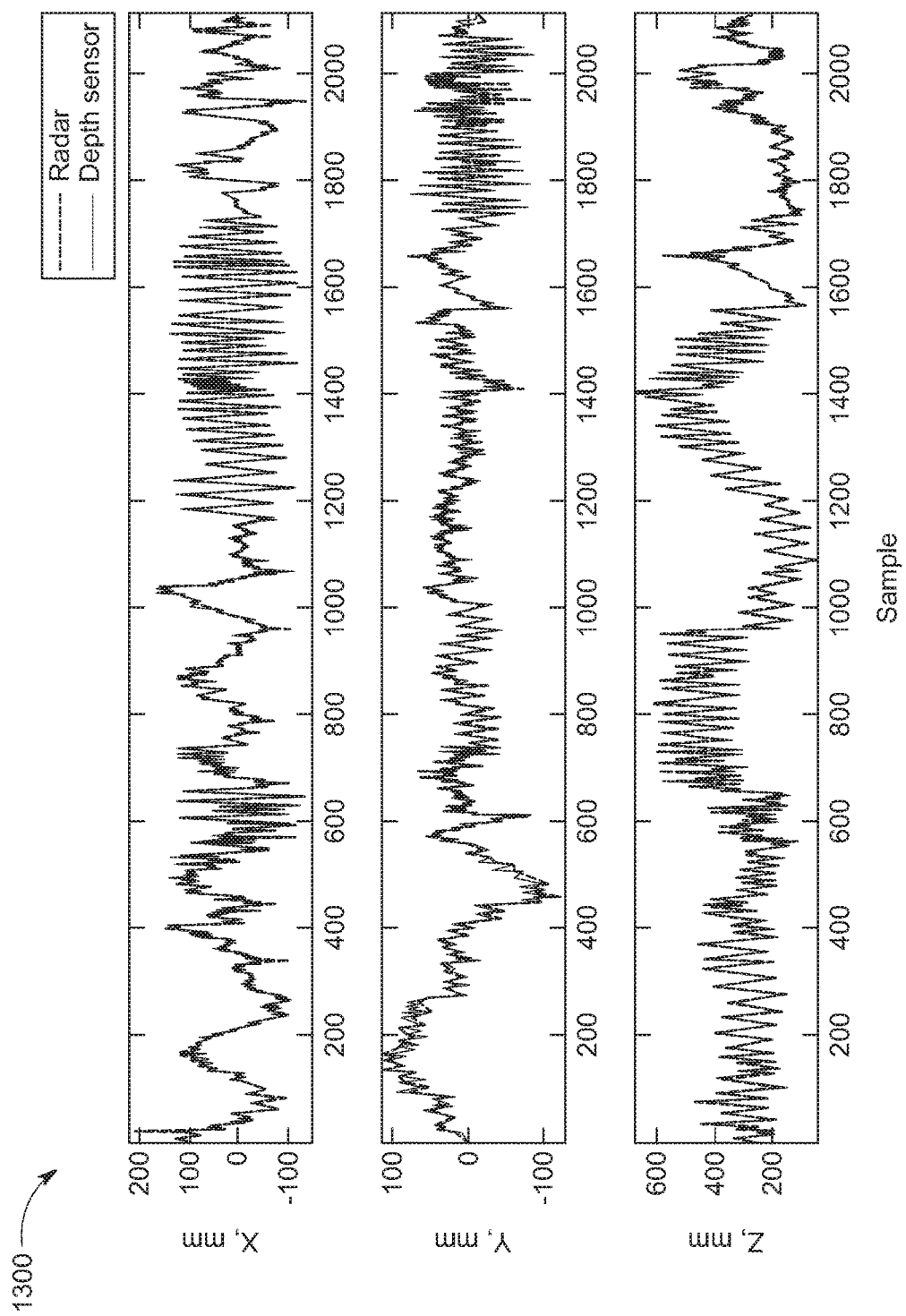
FIG. 13 shows example graphs of 3D positions of an object measured by a radar and a depth sensor in accordance with various embodiments.

FIG. 13 shows example graphs of 3D positions of an object measured by the radar and depth sensor in accordance with various embodiments. FIG. 13 shows the x, y, and z coordinates of a calibration ball (e.g., 1.5 cm radius) measured by the depth and radar sensors after cross-sensor calibration with the quadratic function. In some embodiments, the position of the ball measured by the depth camera can be assumed to be accurate. Overall, the radar is able to follow the ball's position and provides a reasonable estimate of its spatial location.

Figure 14:
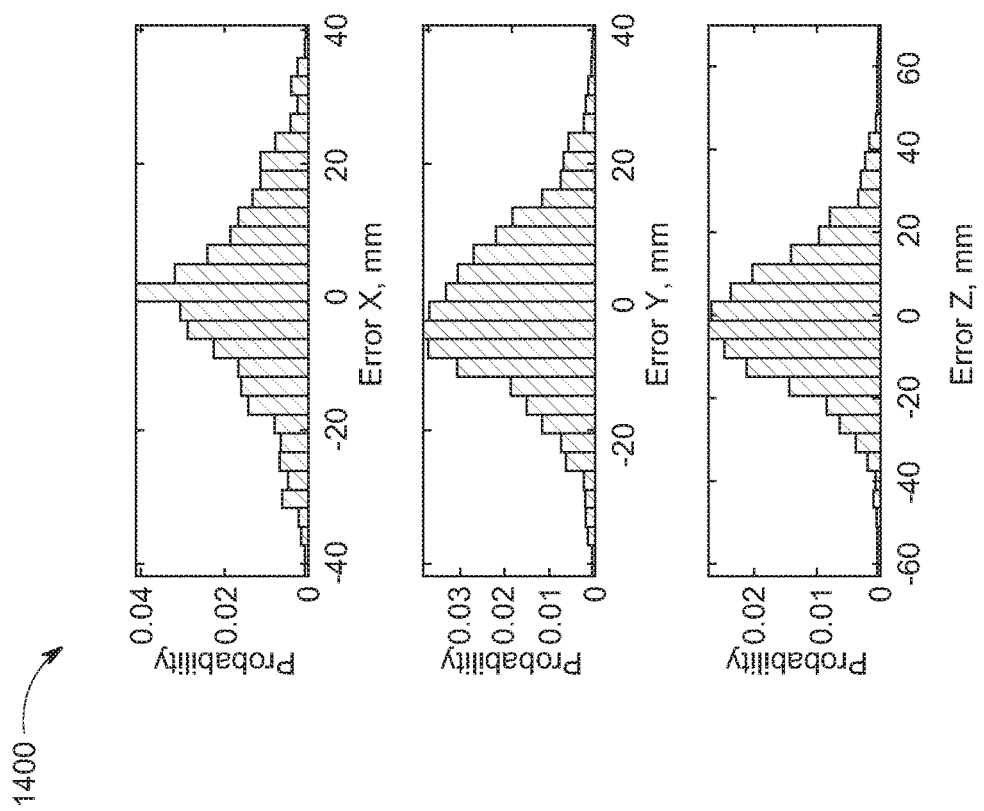
FIG. 14 shows example histograms of positional errors of the graphs of FIG. 13 in accordance with various embodiments.

FIG. 14 shows exemplary histograms of positional errors of the graphs of FIG. 13 in accordance with various embodiments. It is noted that the positional errors closely resemble zero-mean Gaussian distributions. The standard deviations of the errors along the x, y, and z axes were 14.2 mm, 11.7 mm, and 16.2 mm, respectively. The quadratic transformation model result in 0.4 mm, 0.9 mm, and 6.5 mm lower standard deviations along the x, y, and z axes compared to the linear model.

Figure 15:
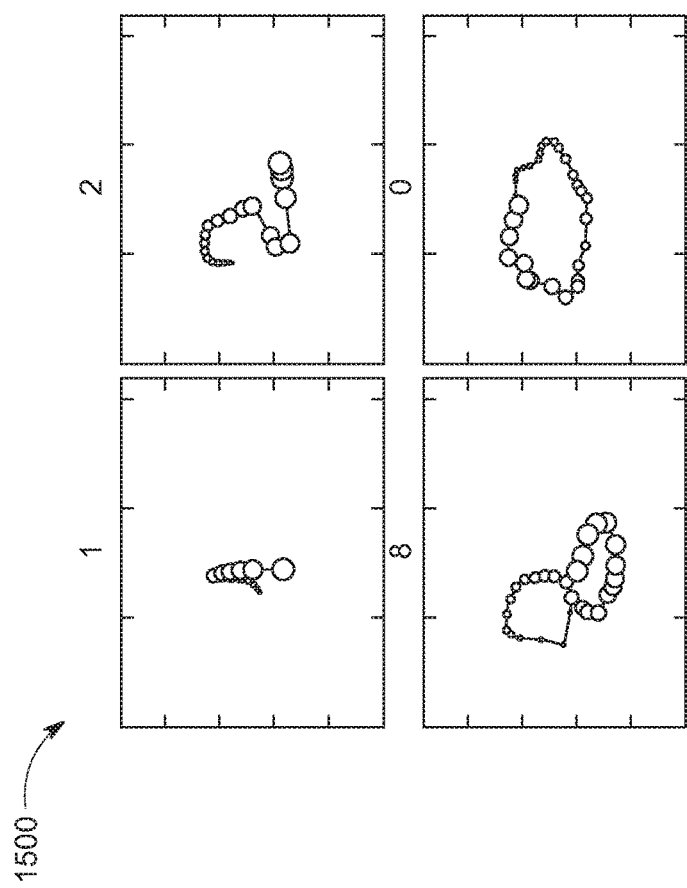
FIG. 15 shows example trajectories of a hand tracked by a radar based system in accordance with various embodiments.

FIG. 15 shows exemplary 2D images of 3D trajectories of a hand tracked by a radar based system in accordance with various embodiments. FIG. 15 depicts the trajectories of a hand tracked by a radar system for four dynamic motions associated with drawing numbers 1, 2, 8, and 0. The first position of the hand is depicted with the smallest dark circle and each subsequent position is represented by a progressively larger circle with higher intensity.

Figure 16:
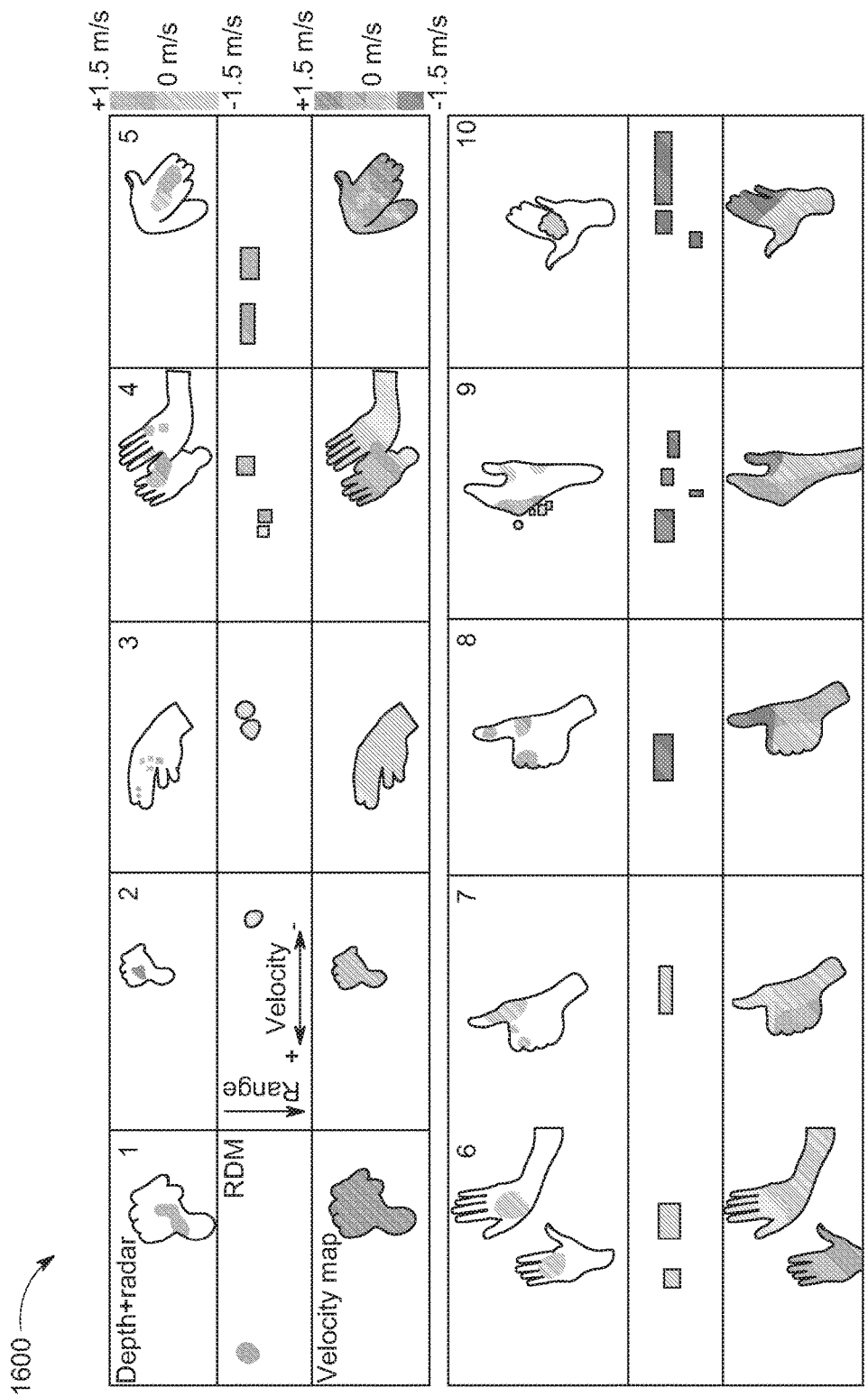
FIG. 16 shows example dynamic hand gestures observed by a radar based system in accordance with various embodiments.

FIG. 16 shows exemplary dynamic hand gestures observed by a radar based system in accordance with various embodiments. FIG. 16 depicts examples of ten example hand gestures observed by the radar system. Each item of FIG. 16 includes three images. For each gesture, the uppermost image depicts the points detected by the radar as circles superimposed on a depth image. The brightness intensity or color of the circle indicates the velocity of the point. The radius of the circle is proportional to the RCS (Radar Cross Section) (e.g., the effective surface of the target that reflects the radar signal). The middle image shows the corresponding RDM (see e.g., FIG. 9). The lowest image shows the brightness intensity or color encoded velocity map of the hand extrapolated from the detected radar points.

Items 1 and 2 depict a first moving forwards and backwards, respective. Items 3 depicts a hand pointing to the side. Items 4 and 6 show movements of two hands. Item 5 depicts a hand opening. Items 7 and 8 depict thumb motion forwards and backwards. Item 9 depicts a hand twisting. Item 10 depicts a calling motion. It is noted that each of the gestures are comprised of several micro-motions, which are detected by the radar based system. The system estimates the spatial coordinates correctly and even separates the two hands moving with different velocities. The system is further able to correctly detect the motion of the thumb.

The radar system senses the hand as a non-rigid object and hence reports multiple points for it. In some embodiments, the location of these points is not constant and they can be located anywhere within the hand. For short ranges, where the hand occupies a significant portion of the FOV (e.g., FIG. 16), gesture detection may present a challenge. To track the hand, the median of the points located on the hand detected by the radar is used. The results of this tracking methodology are demonstrated in FIG. 15. It is noted that the radar system can track the hand successfully.

Embodiments include a short range FMCW mono-pulse radar system for hand gesture sensing. The radar system estimates the range-Doppler map of dynamic gestures together with the 3D position of the detected hand (e.g., at 32 FPS). Embodiments can successfully measure the range and the bidirectional radial velocity. In some embodiments, the radar system can estimate the spatial coordinates with a coverage of ±45° in horizontal directions and ±30° in the vertical directions. Embodiments may be jointly calibrated with a depth sensor. The results of tracking of a metallic ball target demonstrate that the radar system is capable of correctly measuring the 3D position of objects. Embodiments are thus able to reliably detect and allow use of dynamic hand gesture sensing for gesture sensing.

Figure 17:
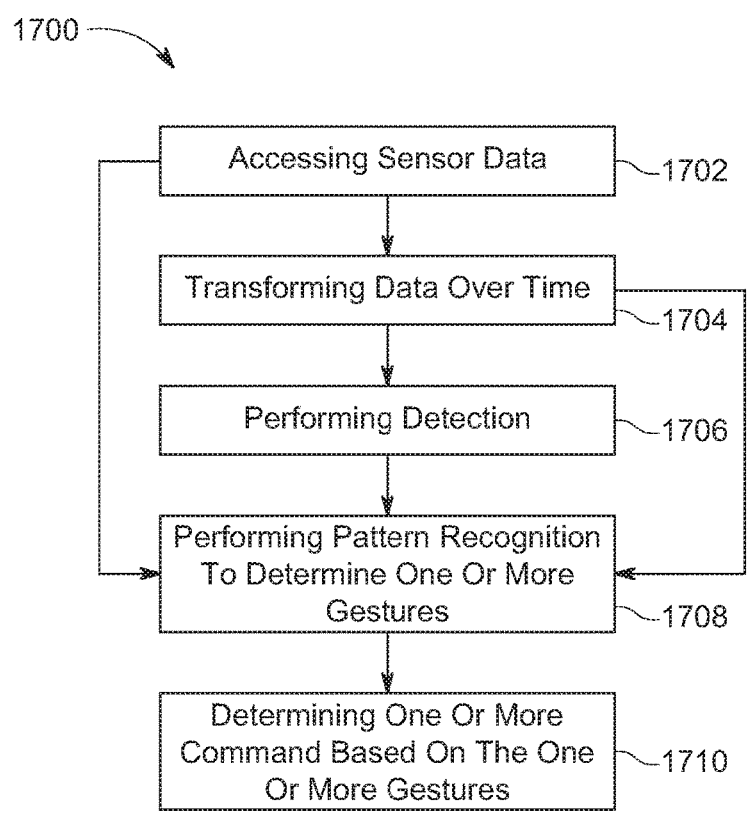
FIG. 17 shows a flowchart of an example computer controlled process for processing radar signals in accordance with various embodiments.

With reference to FIG. 17, flowchart 1700 illustrates example functions used by various embodiments of the present invention. Although specific function blocks ("blocks") are disclosed in flowchart 1700, such steps are examples. That is, embodiments are well suited to performing various other blocks or variations of the blocks recited in flowchart 1700. It is appreciated that the blocks in flowchart 1700 may be performed in an order different than presented, and that not all of the blocks in flowchart 1700 may be performed.

FIG. 17 shows a flowchart of an exemplary computer controlled process for processing radar signals in accordance with various embodiments. FIG. 17 depicts a process 1700 that may be performed with a radar system (e.g., radar system 100) and/or a computing system (e.g., computer system 1800) for detecting and determining gestures. In some embodiments, the process 1700 may be performed in a manner as described with respect to FIG. 5.

At block 1702, sensor data is accessed. The sensor data can be radar signals received from a plurality of receivers (e.g., receivers Rx1, Rx2, and Rx3), as described herein. The signals may be processed with analog circuits and/or a microcontroller, as described herein.

At block 1704, the data is transformed over time. In some embodiments, the data is transformed with a fast Fourier transform, as described herein.

At block 1706, (object) detection is performed. The output of the detection can include location and velocity data for points of one or more moving objects. In some embodiments, the detection is a constant false alarm rate (CFAR) detection, as described herein.

At block 1708, pattern recognition processes to determine one or more gestures are performed. The pattern recognition can be performed on the location and velocity data to determine one or more gestures that were performed, as described herein. In some embodiments, pattern recognition may be performed after block 1702 or 1704.

At block 1710, one or more commands are determined based on the one or more gestures. As described herein, one or more commands associated with detected gestures may be determined and communicated to another system. For example, a command to change the radio station may be determined based on a detected gesture and the command is transmitted to a radio system.

EXAMPLE COMPUTER SYSTEM ENVIRONMENT

Figure 18:
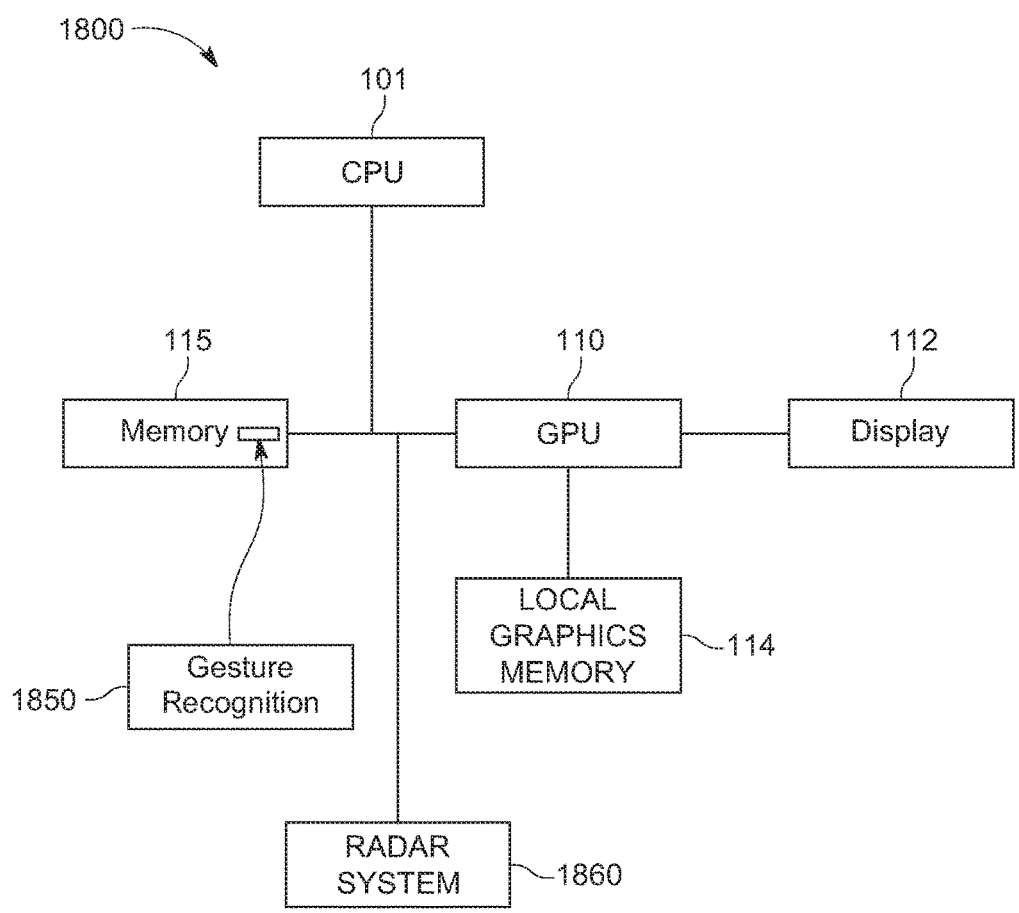
FIG. 18 shows an example computer system in accordance with various embodiments.

FIG. 18 shows a computer system 1800 in accordance with one embodiment of the present invention. Computer system 1800 depicts the components of a basic computer system in accordance with embodiments of the present invention providing the execution platform for certain hardware-based and software-based functionality. In general, computer system 1800 comprises at least one CPU 1801, a system memory 1815, and may include at least one graphics processor unit (GPU) 1810. The CPU 1801 can be coupled to the system memory 1815 via a bridge component/memory controller (not shown) or can be directly coupled to the system memory 1815 via a memory controller (not shown) internal to the CPU 1801. The GPU 1810 may be coupled to a display 1812. One or more additional GPUs can optionally be coupled to system 1800 to further increase its computational power. The GPU(s) 1810 is coupled to the CPU 1801 and the system memory 1815. The GPU 1810 can be implemented as a discrete component, a discrete graphics card designed to couple to the computer system 1800 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 1814 may be included for the GPU 1810 for high bandwidth graphics data storage. The computer system 1800 may be coupled to a radar system 1860, as described herein.

The CPU 1801 and the GPU 1810 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 1810 can also be implemented in, and performed by, a suitably equipped CPU 1801. Additionally, while embodiments herein may make reference to a GPU, it should be noted that the described circuits and/or functionality can also be implemented and other types of processors (e.g., general purpose or other special-purpose coprocessors) or within a CPU.

System 1800 can be implemented as, for example, a desktop computer system or server computer system having a powerful general-purpose CPU 1801 coupled to a dedicated graphics rendering GPU 1810. In such an embodiment, components can be included that add peripheral buses, specialized audio/video components, IO devices, and the like. Similarly, system 1800 can be implemented as vehicle dashboard component, a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 1800 can also be implemented as a "system on a chip", where the electronics (e.g., the components 1801, 1815, 1810, 1814, and the like) of a computing device are wholly contained within a single integrated circuit die. Examples include a hand-held instrument with a display, a car navigation system, a portable entertainment system, and the like.

In one exemplary embodiment, GPU 1810 is operable for general-purpose computing on graphics processing units (GPGPU) computing. General-purpose computing on graphics processing units (GPGPU) programs or applications may be designed or written with the Compute Unified Device Architecture (CUDA) framework and Open Computing Language (OpenCL) framework. GPU 1810 may execute Compute Unified Device Architecture (CUDA) programs and Open Computing Language (OpenCL) programs. It is appreciated that the parallel architecture of GPU 1810 may have significant performance advantages over CPU 1801.

In some embodiments, the memory 1815 includes a gesture recognition program 1850 for recognizing, classifying, and determining gestures and translating the gestures into commands (e.g., enabling control of the computer system 1800).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for gesture sensing comprising:
a processing element;
a depth sensor communicatively coupled to the processing element;
a color sensor;
a transmitter configured to transmit radar signals, wherein the transmitter is coupled to the processing element;
a plurality of receivers configured to receive radar signal reflections, wherein the plurality of receivers is coupled to the processing element, and
the processing element is configured to:
cross-calibrate the color sensor, the plurality of receivers, and the depth sensor;
generate location and velocity data based on the radar signal reflections received by the plurality of receivers and by performing a transform over time process;
register information received from the plurality of receivers with the information received from the depth sensor based on a cross-calibration result; and
determine a hand gesture based on the location and velocity data;
wherein the transmitter and plurality of receivers are configured for short range radar based detection, and
wherein the location and velocity data are generated further based on information generated by the depth sensor and information generated by the color sensor.

2. The apparatus as described in claim 1, wherein the short range radar based detection has a range of one meter.

3. The apparatus as described in claim 1, wherein the transmitter and plurality of receivers are a portion of a user interface device of a vehicle.

4. The apparatus as described in claim 1, wherein a first pair of receivers of the plurality of receivers is configured to measure a vertical component of a gesture movement and a second pair of receivers of the plurality of receivers is configured to measure a horizontal component of a gesture movement.

5. The apparatus as described in claim 1, wherein the processing element is configured to determine a 3D position and radial velocity for a signal reflection received by the plurality of receivers.

6. The apparatus as described in claim 5, wherein the processing element is further configured to determine an elevation angle and an azimuth angle for an object from which a signal reflection received by the plurality of receivers.

7. The apparatus as described in claim 1, wherein the transmitter and the plurality of receivers are operated in a frequency-modulated continuous-wave (FMCW) mode.

8. The apparatus as described in claim 1, wherein the transmitter and the plurality of receivers are part of a multiple input single output (MISO) device.

9. The apparatus as described in claim 1, wherein the hand gesture is a dynamic hand gesture and the processing element is configured to automatically recognize the hand gesture and to determine a command associated with the dynamic hand gesture.

10. The apparatus as described in claim 1, wherein the plurality of receivers is spatially distributed.

11. The apparatus as described in claim 1, wherein the transform over time process comprises a Fast Fourier Transform process.

12. The apparatus as described in claim 1 further comprising a microcontroller separate from the processing element and configured to perform static background subtraction.

13. The apparatus as described in claim 1, wherein the determining a hand gesture based on the location and velocity data comprises a pattern recognition process by using a deep neural network.

14. The apparatus as described in claim 1, wherein the transform over time process comprises a wavelet analysis process.

15. The apparatus as described in claim 1, wherein the transform over time process comprises a super resolution process.

16. A system for hand gesture detection and classification, the system comprising:
a processing element;
a depth sensor communicatively coupled to the processing element;
a color sensor;
a transmitter configured for transmitting radar signals, wherein the transmitter is coupled to the processing element;
a plurality receivers comprising a first receiver, a second receiver, and a third receiver and configured for receiving the radar signals, and wherein the first receiver and the second receiver are configured for measuring a horizontal component of a movement and the second receiver and the third receiver are configured for measuring a vertical component of a movement, and wherein the plurality of receivers are communicatively coupled to the processing element; and
the processing element is configured to:
cross-calibrate the color sensor, the depth sensor, and the plurality of receivers;
register information received from the plurality of receivers with information received from the depth sensor based on a cross-calibration result;
generate location and velocity data based on reflections of the radar signals received by the plurality of receivers and based on information generated by the depth sensor and by performing a transform over time process; and
determine a hand gesture based on the location and velocity data;
wherein the transmitter and the plurality of receivers are configured for short range radar based detection, and
wherein the location and velocity data are generated further based on information generated by the color sensor.

17. The system as described in claim 16, wherein the short range based detection of the hand gestures has a range of one meter.

18. The system as described in claim 16, wherein the transmitter and the plurality of receivers are a portion of a user interface device of a vehicle.

19. The system as described in claim 16, wherein the processing element is configured to determine a 3D position and radial velocity for a signal reflection received from the plurality of receivers.

20. The system as described in claim 19, wherein the processing element is further configured to determine an elevation angle and an azimuth angle for the signal reflection received from the plurality of receivers.

21. The system as described in claim 16, wherein the transmitter and the plurality of receivers are operated in a frequency-modulated continuous-wave (FMCW) mode.

22. The system as described in claim 16, wherein the transform over time process comprises a Fast Fourier Transform process.

23. The system as described in claim 16, wherein determining a hand gesture based on the location and velocity data comprises a pattern recognition process by using a deep neural network.

24. The system as described in claim 16, wherein the transform over time process comprises a wavelet analysis process.

25. The system as described in claim 4, wherein the transform over time process comprises a super resolution process.

26. A mobile apparatus comprising:
a processing element;
a depth sensor communicatively coupled to the processing element;
a color sensor;
a transmitter configured for transmitting radar signals, wherein the transmitter is coupled to the processing element;
a plurality of receivers comprising a first receiver, a second receiver, and a third receiver and configured for receiving the radar signals, and wherein the first receiver and the second receiver are configured for measuring a horizontal component of a movement and the second receiver and the third receiver are configured for measuring a vertical component of a movement, and wherein the a plurality of receivers are communicatively coupled to the processing element; and the processing element is configured to:
cross-calibrate the color sensor, the depth sensor, and the plurality of receivers;
generate location and velocity data based on reflections of the radar signals received by the plurality of receivers and by performing a transform over time process;
detect a hand gesture of a driver of the mobile apparatus based on the location and velocity data; and
automatically recognize the hand gesture and to determine a command associated with the hand gesture;
wherein the transmitter and the a plurality of receivers are configured for short range radar based detection, and
wherein the location and velocity data are generated further based on information generated by the color sensor and based on information generated by the depth sensor.

27. The mobile apparatus as described in claim 26, wherein the short range based detection has a range of substantially one meter.

28. The mobile apparatus as described in claim 26, wherein the processing element is further configured to perform background subtraction.

29. The mobile apparatus as described in claim 26, wherein the processing element is configured to determine a 3D position and radial velocity for a signal reflection from an object received from the plurality of receivers.

30. The mobile apparatus as described in claim 26, wherein the transform over time process comprises a Fast Fourier Transform process.

31. The mobile apparatus as described in claim 26, wherein the transform over time process comprises a wavelet analysis process.

32. The mobile apparatus as described in claim 26, wherein the transform over time process comprises a super resolution process.

* * * * *